(12) United States Patent
Bergeal et al.

(10) Patent No.: US 9,057,310 B2
(45) Date of Patent: *Jun. 16, 2015

(54) CATALYSED SOOT FILTER FOR TREATING THE EXHAUST GAS OF A COMPRESSION IGNITION ENGINE

(71) Applicant: Johnson Matthey Public Limited Company, London (GB)

(72) Inventors: David Bergeal, Ware (GB); Andrew Francis Chiffey, Ware (GB); John Benjamin Goodwin, Royston (GB); Daniel Hatcher, Royston (GB); Francois Moreau, Cambridge (GB); Agnes Raj, Royston (GB); Raj Rao Rajaram, Slough (GB); Paul Richard Phillips, Royston (GB); Cathal Prendergast, Gamlingay (GB); Gavin Michael Brown, Saffron Walden (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/086,062

(22) Filed: Nov. 21, 2013

(65) Prior Publication Data

US 2014/0147359 A1 May 29, 2014

Related U.S. Application Data

(60) Provisional application No. 61/728,834, filed on Nov. 21, 2012.

(30) Foreign Application Priority Data

Nov. 21, 2012 (GB) .................................. 1220912.8
May 17, 2013 (GB) .................................. 1308934.7

(51) Int. Cl.
*B01D 50/00* (2006.01)
*B01D 53/34* (2006.01)
(Continued)

(52) U.S. Cl.
CPC ............ *F01N 3/2807* (2013.01); *B01D 53/945* (2013.01); *B01J 23/58* (2013.01);
(Continued)

(58) Field of Classification Search
CPC ............ B01J 23/58; B01J 21/04; B01J 21/08; B01J 21/10; B01J 21/12; B01D 53/945; F01N 3/021; F01N 3/2885
USPC .................. 502/261–263, 302–304, 326–328, 502/332–334, 339, 341, 349–351, 355, 416, 502/439, 524, 527.12, 527.13; 423/213.5; 422/180; 60/299
See application file for complete search history.

(56) References Cited

U.S. PATENT DOCUMENTS

| 4,590,289 A | 5/1986 | Albert et al. |
| 5,045,519 A | 9/1991 | Meyer et al. |

(Continued)

FOREIGN PATENT DOCUMENTS

| EP | 0766993 A2 | 4/1997 |
| EP | 0945165 A2 | 9/1999 |

(Continued)

OTHER PUBLICATIONS

DieselNet Technology Guide "Engine Design for Low Emissions", Revision 2010.12a (www.DieselNet.com/tech/engine_ltc.php. Copyright © Ecopoint Inc.).

(Continued)

*Primary Examiner* — Cam N. Nguyen
(74) *Attorney, Agent, or Firm* — Kevin M. Carroll

(57) ABSTRACT

A catalysed soot filter comprising an oxidation catalyst for treating carbon monoxide (CO) and hydrocarbons (HCs) in exhaust gas from a compression ignition engine disposed on a filtering substrate, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component.

19 Claims, 2 Drawing Sheets

(51) Int. Cl.

| | | |
|---|---|---|
| *B01D 53/56* | (2006.01) | |
| *B01D 53/94* | (2006.01) | |
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *F01N 3/10* | (2006.01) | |
| *B01J 21/00* | (2006.01) | |
| *B01J 23/00* | (2006.01) | |
| *B01J 23/02* | (2006.01) | |
| *B01J 23/06* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 21/04* | (2006.01) | |
| *C01B 31/08* | (2006.01) | |
| *F01N 3/28* | (2006.01) | |
| *F01N 3/20* | (2006.01) | |
| *B01J 37/02* | (2006.01) | |
| *B01J 35/00* | (2006.01) | |
| *B01J 29/74* | (2006.01) | |
| *B01J 35/02* | (2006.01) | |
| *B01J 37/00* | (2006.01) | |

(52) U.S. Cl.
CPC ............. *F01N 3/20* (2013.01); *B01J 37/0244* (2013.01); *B01D 53/944* (2013.01); *F01N 3/103* (2013.01); *F01N 3/2828* (2013.01); *B01D 2255/1021* (2013.01); *B01D 2255/1023* (2013.01); *B01D 2255/2092* (2013.01); *B01D 2255/50* (2013.01); *B01D 2255/908* (2013.01); *B01D 2255/912* (2013.01); *B01D 2258/012* (2013.01); *B01D 2255/204* (2013.01); *B01D 2255/2042* (2013.01); *B01D 2255/2065* (2013.01); *B01D 2255/20715* (2013.01); *B01D 2255/902* (2013.01); *B01D 2255/9155* (2013.01); *B01J 37/0246* (2013.01); *B01J 37/0248* (2013.01); *B01J 35/0006* (2013.01); *B01J 37/0205* (2013.01); *B01J 23/002* (2013.01); *B01J 29/7415* (2013.01); *B01J 35/023* (2013.01); *B01J 37/0036* (2013.01); *B01J 2523/00* (2013.01); *F01N 2510/0684* (2013.01)

(56) References Cited

U.S. PATENT DOCUMENTS

| | | | |
|---|---|---|---|
| 5,248,251 A | 9/1993 | Dalla Betta et al. | |
| 5,473,887 A | 12/1995 | Takeshima et al. | |
| 5,593,654 A | 1/1997 | Decker, Jr. et al. | |
| 5,643,542 A | 7/1997 | Leyrer et al. | |
| 5,837,634 A | 11/1998 | McLaughlin et al. | |
| 6,217,837 B1 | 4/2001 | Narula et al. | |
| 6,224,846 B1 | 5/2001 | Hurlburt et al. | |
| 6,338,831 B1 | 1/2002 | Strehlau et al. | |
| 6,517,795 B1 | 2/2003 | Noweck et al. | |
| 6,585,945 B2* | 7/2003 | Wu et al. | 423/239.1 |
| 6,699,448 B2* | 3/2004 | Wu et al. | 423/239.1 |
| 7,235,507 B2* | 6/2007 | Xu et al. | 502/63 |
| 8,242,045 B2* | 8/2012 | Kulkarni et al. | 502/303 |
| 8,246,923 B2* | 8/2012 | Southward et al. | 423/213.5 |
| 8,409,515 B2* | 4/2013 | Ren et al. | 422/171 |
| 8,668,877 B2* | 3/2014 | Wei et al. | 422/177 |
| 8,741,242 B2* | 6/2014 | Cooper et al. | 423/213.5 |
| 2003/0125202 A1 | 7/2003 | Ruwisch | |
| 2003/0206845 A1* | 11/2003 | Wu et al. | 423/239.1 |
| 2005/0056006 A1* | 3/2005 | Huang et al. | 60/297 |
| 2007/0161507 A1* | 7/2007 | Kulkarni et al. | 502/303 |
| 2008/0125308 A1 | 5/2008 | Fujdala et al. | |
| 2009/0155135 A1 | 6/2009 | Li | |
| 2010/0290964 A1 | 11/2010 | Southward et al. | |
| 2011/0146251 A1* | 6/2011 | Bergeal et al. | 60/299 |
| 2012/0055141 A1 | 3/2012 | Hilgendorff | |
| 2012/0065058 A1 | 3/2012 | Matsueda et al. | |
| 2012/0124974 A1* | 5/2012 | Li et al. | 60/297 |
| 2012/0128557 A1 | 5/2012 | Nunan et al. | |
| 2013/0084222 A1* | 4/2013 | Grubert et al. | 422/170 |
| 2014/0065043 A1 | 3/2014 | Kato et al. | |

FOREIGN PATENT DOCUMENTS

| | | |
|---|---|---|
| EP | 1306530 | 5/2003 |
| EP | 2000639 | 12/2008 |
| EP | 2070581 A1 | 6/2009 |
| EP | 2255875 | 12/2010 |
| EP | 2689842 | 1/2014 |
| WO | 9317968 | 9/1993 |
| WO | 9947260 A1 | 9/1999 |
| WO | 0034632 A1 | 6/2000 |
| WO | 2007024309 A1 | 3/2007 |
| WO | 2008132452 A2 | 11/2008 |
| WO | 2012120292 A1 | 9/2012 |
| WO | 2012128297 | 9/2012 |

OTHER PUBLICATIONS

Low Emission Zones in Europe "Europe-wide Information on LEZ's" (www.lowemissionzones.eu/what-are-lezs?showall=1&limitstart=).

International Search Report dated Apr. 22, 2014 issued in corresponding application PCT/GB2013/053068.

* cited by examiner

CATALYSED SOOT FILTER FOR TREATING THE EXHAUST GAS OF A COMPRESSION IGNITION ENGINE

CROSS REFERENCE TO RELATED APPLICATIONS

This application claims priority benefit to Great Britain Patent Application No. 1220912.8 filed on Nov. 21, 2012, and to U.S. Provisional Patent Application No. 61/728,834 filed on Nov. 21, 2012, and to Great Britain Patent Application No. 1308934.7 filed on May 17, 2013, all of which are incorporated herein by reference.

FIELD OF THE INVENTION

The invention relates to catalysed soot filter for a compression ignition engine, which catalysed soot filter comprising an oxidation catalyst disposed on a filtering substrate and to an exhaust system comprising the catalysed soot filter, to a compression ignition engine comprising the exhaust system and to a vehicle comprising the exhaust system. The invention also relates to use of the catalysed soot filter and to a method of treating an exhaust gas from a compression ignition engine.

BACKGROUND TO THE INVENTION

Generally, there are four classes of pollutant that are legislated against by inter-governmental organisations throughout the world: carbon monoxide (CO), unburned hydrocarbons (HCs), oxides of nitrogen ($NO_x$) and particulate matter (PM). As emissions standards for permissible emission of pollutants in exhaust gases from vehicular engines become progressively tightened, there is a need to provide improved catalysts that are able to meet these standards and which are cost-effective.

For compression ignition engines, such as diesel engines, a catalysed soot filter (CSF) is typically used to treat the exhaust gas produced by such engines. CSFs generally catalyse the oxidation of (1) carbon monoxide (CO) to carbon dioxide ($CO_2$), (2) HCs to carbon dioxide ($CO_2$) and water ($H_2O$) and (3) the oxidation of PM filtered from the exhaust gas. The two most important PM oxidation reactions are oxidation in nitrogen dioxide ($NO_2+C \rightarrow NO+CO$) and oxygen ($O_2+2C \rightarrow 2CO$ or $O_2+C \rightarrow CO_2$). Sources of $NO_2$ for the former reaction are the engine itself and nitrogen monoxide (also present in the exhaust gas) oxidised either on an upstream substrate monolith comprising a diesel oxidation catalyst (DOC) or on the filter catalyst itself. Exhaust gas temperatures for compression ignition engines, such as diesel engines particularly for light-duty diesel vehicles, are relatively low (e.g. about 400° C.) and so one challenge is to develop durable CSF catalyst formulations with low "light-off" temperatures.

The activity of oxidation catalysts, such as CSFs and DOCs, is often measured in terms of their "light-off" temperature, which is the temperature at which the catalyst starts to perform a particular catalytic reaction or performs that reaction to a certain level. Normally, "light-off" temperatures are given in terms of a specific level of conversion of a reactant, such as conversion of carbon monoxide. Thus, a $T_{50}$ temperature is often quoted as a "light-off" temperature because it represents the lowest temperature at which a catalyst catalyses the conversion of a reactant at 50% efficiency.

Low Emission Zones (LEZs) are areas or roads across Europe, e.g. Berlin, London, Stockholm, Eindhoven etc., where the most polluting vehicles are restricted from entering (see http://www.lowemissionzones.eu/what-are-lezs?showall=1&limitstart=). There is growing evidence that poor air quality is bad for health and life expectancy. Nitrogen dioxide is considered to have both short-term and long-term effects on health. It affects lung function and exposure enhances the response to allergens in sensitised individuals. It has been suggested that apparent effects of nitrogen dioxide on health may be due to particles or to its combination with particles. $NO_2$ can also contribute to reactions causing photochemical smog. EU Air Quality Standards (binding on EU Member States) sets Limit Values for the protection of human health. The EU Air Quality Standard for inter alia $NO_2$ was set from 1 Jan. 2010 at 200 µg/m³ (105 ppb) average over a 1 hour period, not to be exceeded >18 times a calendar year; and a 40 µg/m³ (21 ppb) average per calendar year.

There is therefore a need in the art for exhaust systems which avoid or reduce $NO_2$ emission into the atmosphere, particularly for vehicles accessing LEZs. These can include factory fit exhaust systems and systems to be retrofitted to existing vehicles.

WO 00/34632 discloses a system for treating the exhaust gases from diesel engines comprising a first catalyst effective to oxidise hydrocarbons, a second catalyst effective to convert NO to $NO_2$, a trap for particulates, on which particulates may be combusted in $NO_2$. The first catalyst can be platinum dispersed on ceria or on a metal oxide washcoat which incorporates ceria. The Examples explain that: "It is evident that once the HC (represented by $C_3H_6$) has been removed in the first oxidation step the oxidation of NO to $NO_2$ can take place more completely".

Catalysts that are used to oxidise carbon monoxide (CO), hydrocarbons (HCs) and sometimes also oxides of nitrogen ($NO_x$) in an exhaust gas emitted from a compression ignition engine generally comprise at least one platinum group metal, such as platinum or palladium. Platinum is more active than palladium at catalysing the oxidation of CO and HCs in the exhaust gas from a compression ignition engine and the inclusion of palladium in such catalysts was generally avoided because of its susceptibility to poisoning by sulphur. However, the use of ultra-low sulphur fuels, the relative cost of palladium to platinum, and improvements in catalyst durability that can be obtained by inclusion of palladium have resulted in catalyst formulations comprising palladium, especially formulations comprising both palladium and platinum, becoming favoured.

Even though, in general, the cost of palladium has historically been lower than that of platinum, both palladium and platinum are expensive metals. Oxidation catalysts that show improved catalytic activity without increasing the total amount of platinum and palladium, or that show similar catalytic activity to existing oxidation catalysts with a lower amount of platinum and palladium, are desirable.

SUMMARY OF THE INVENTION

The inventors have surprisingly found that an oxidation catalyst having advantageous activity including stable, relatively low NO oxidation activity can be obtained when a combination of (i) an alkaline earth metal component and (ii) an alumina support material that has been modified to include a heteroatom component, is included in a catalyst formulation comprising at least one of platinum and palladium. Such catalysts can be used with advantage in exhaust systems for use in LEZs, where low $NO_2$ emissions are required. Such catalysts have been found to have excellent low temperature CO oxidation activity. The catalysts are particularly effective in converting relatively high levels of CO in exhaust gas produced by the compression ignition engine, particularly at temperatures below 250° C. The catalysts may also show good oxidation activity towards HCs, particularly unsaturated HCs such as alkenes, at low temperatures. The relatively low temperature oxidation activity of the catalyst renders it particularly suitable for use in combination with other emissions control devices in an exhaust system. In particular, although NO oxidation is relatively low, the oxidation catalyst is able to oxidise nitrogen oxide (NO) to nitrogen dioxide ($NO_2$), which can be advantageous when the oxidation catalyst is upstream of a selective catalytic reduction (SCR) catalyst or a filter catalysed with a selective catalytic reduction catalyst.

Therefore, according to a first aspect, the invention provides a catalysed soot filter comprising an oxidation catalyst for treating carbon monoxide (CO) and hydrocarbons (HCs) in exhaust gas from a compression ignition engine disposed on a filtering substrate, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component.

Without wishing to be bound by any particular theory, inventors believe that the stable, relatively low NO oxidation activity of oxidation catalysts for use in the present invention may be due to a combination of factors, including competitive selective oxidation of CO and HC species, i.e. NO oxidation occurs only after CO and HC have been oxidatively removed; and the oxidation by $NO_2$ of non-polar (e.g. aliphatic), longer, straight-chain HC species such as dodecane (akin to "classical" lean $NO_x$ catalysis (also known as HC—SCR), i.e. $\{HC\}+NO_x \rightarrow N_2+CO_2+H_2O$). Accordingly, it is believed that the oxidation catalyst for use in the present invention can not only reduce $NO_2$ emissions from the catalysed soot filter per se (by relatively low NO oxidation activity) but also to reduce $NO_2$ emissions from upstream catalysts entering the catalysed soot filter, i.e. the quantity of $NO_2$ exiting the catalysed soot filter according to the invention may be less than the quantity entering it.

The initial oxidative activity of a freshly prepared oxidation catalyst often deteriorates until the catalyst reaches an aged state. Repeated exposure of the oxidation catalyst to hot exhaust gas can cause sintering and/or alloying of the platinum group metal (PGM) components of the catalyst until it reaches an aged state. This deterioration in activity can be problematic, particularly when pairing the oxidation catalyst with one or more other emissions control devices in an exhaust system. The oxidation catalyst of the invention may have stable activity toward oxidising nitrogen oxide (NO) to nitrogen dioxide ($NO_2$) (i.e. the "fresh" oxidative activity of the catalyst toward NO is the same or similar to the "aged" oxidative activity of the catalyst). This is particularly advantageous for exhaust systems where the oxidation catalyst is combined with a selective catalytic reduction (SCR) catalyst or a filter catalysed with a selective catalytic reduction catalyst because an exhaust gas having a stable ratio of $NO:NO_2$ can be passed into the SCR catalyst or SCR catalysed filter.

A second aspect of the invention relates to an exhaust system for a compression ignition engine comprising a catalysed soot filter according to the first aspect of the invention.

In a third aspect, the invention relates to a compression ignition engine comprising an exhaust system according to the second aspect of the invention.

In a fourth aspect, the invention relates to a vehicle comprising a compression ignition engine according to the third aspect of the invention.

In a fifth aspect, the invention provides the use of catalysed soot filter according to the first aspect of the invention to oxidise carbon monoxide (CO) and hydrocarbons (HCs) and for reducing $NO_2$ emissions in an exhaust gas from a compression ignition engine.

A sixth aspect of the invention relates to a method of treating carbon monoxide (CO) and hydrocarbons (HCs) and $NO_2$ in an exhaust gas from a compression ignition engine, which method comprises contacting the exhaust gas with a catalysed soot filter according to the first aspect according to the invention

DETAILED DESCRIPTION OF THE INVENTION

The invention relates to a catalysed soot filter comprising an oxidation catalyst comprising an alkaline earth metal component. It has surprisingly been found that a catalyst having advantageous oxidising activity, particularly a low CO $T_{50}$, can be obtained for catalyst formulations comprising an alkaline earth metal component and a modified alumina incorporating a heteroatom component.

Typically, the alkaline earth metal component comprises magnesium (Mg), calcium (Ca), strontium (Sr), barium (Ba) or a combination of two or more thereof. It is preferred that the alkaline earth metal component comprises calcium (Ca), strontium (Sr), or barium (Ba), more preferably strontium (Sr) or barium (Ba), and most preferably the alkaline earth metal component comprises barium (Ba).

Generally, the alkaline earth metal component comprises a single alkaline earth metal selected from the group consisting of (Mg), calcium (Ca), strontium (Sr) and barium (Ba). Preferably, the alkaline earth metal component comprises a single alkaline earth metal selected from the group consisting of calcium (Ca), strontium (Sr) and barium (Ba), more preferably strontium (Sr) and barium (Ba), and most preferably the alkaline earth metal component comprises a single alkaline earth metal that is barium (Ba).

Typically, the amount of the alkaline earth metal component is 0.07 to 3.75 mol ft$^{-3}$, particularly 0.1 to 3.0 mol ft$^{-3}$, more particularly 0.2 to 2.5 mol ft$^{-3}$ (e.g. 0.25 to 1.0 mol ft$^{-3}$), such as 0.3 to 2.25 mol ft$^{-3}$, especially 0.0.35 to 1.85 mol ft$^{-3}$, preferably 0.4 to 1.5 mol ft$^{-3}$, even more preferably 0.5 to 1.25 mol ft$^{-3}$. Without wishing to be bound by theory, it is believed that the number of alkaline earth metal atoms that are present contributes to the advantageous activity of the catalyst and that this activity "levels-off" once the number of alkaline earth metal atoms has reached a certain amount. The ability of the catalyst to oxidise certain HC species and NO can be reduced with increasing alkaline earth metal content.

Generally, the total amount of the alkaline earth metal component is 10 to 500 g ft$^{-3}$ (e.g. 60 to 400 g ft$^{-3}$ or 10 to 450 g ft$^{-3}$), particularly 20 to 400 g ft$^{-3}$, more particularly 35 to 350 g ft$^{-3}$, such as 50 to 300 g ft$^{-3}$, especially 75 to 250 g ft$^{-3}$.

The oxidation catalyst for use in the present invention, in general, comprises an amount of the alkaline earth metal component of 0.1 to 20% by weight, preferably 0.5 to 17.5% by weight, more preferably 1 to 15% by weight, and even more preferably 1.5 to 12.5% by weight. The amount of the alkaline earth metal component may be from 1.0 to 8.0% by weight, such as 1.5 to 7.5% by weight, particularly 2.0 to 7.0% by weight (e.g. 2.5 to 6.5% by weight or 2.0 to 5.0% by weight). The amount of the alkaline earth metal component may be from 5.0 to 17.5% by weight, such as 7.5 to 15% by weight, particularly 8.0 to 14% by weight (e.g. 8.5 to 12.5% by weight or 9.0 to 13.5% by weight).

Typically, the ratio of the total mass of the alkaline earth metal component to the total mass of the platinum group metal (PGM) component is 0.25:1 to 20:1 (e.g. 0.3:1 to 20:1). It is preferred that the ratio of the total mass of the alkaline earth metal component to the total mass of the platinum group metal (PGM) component is 0.5:1 to 17:1, more preferably 1:1 to 15:1, particularly 1.5:1 to 10:1, still more preferably 2:1 to 7.5:1, and even more preferably 2.5:1 to 5:1. When a platinum (Pt) component is present, then preferably the total mass of the alkaline earth component is greater than the total mass of the platinum (Pt) component.

The support material typically comprises, or consists essentially of, a modified alumina incorporating a heteroatom component. The heteroatom component that is incorporated into the alumina generally changes the chemical characteristics, physical structure and/or physical properties of the material in comparison to alumina itself, and generally also in comparison to a mixture of alumina with the heteroatom component. It is thought that the presence of the heteroatom component modifies the interaction of the alumina with the alkaline earth component. The modified alumina is typically alumina present in, or originating from, the gamma form (i.e. γ-alumina).

Typically, the heteroatom component comprises an element selected from the group consisting of a lanthanide and any one of Groups 1 to 14 of the Periodic Table (the IUPAC nomenclature for numbering the Groups of the Periodic Table is used herein, such that Group 1 comprises the alkali metals, Group 4 comprises Ti, Zr etc., and Group 14 comprises C, Si etc.). Preferably, the heteroatom component comprises an element selected from Group 2 (e.g. Mg, Ca, Sr or Ba), Group 4 (e.g. Ti or Zr), Group 14 (e.g. Si) of the Periodic Table and a lanthanide (e.g. La or Ce), such as an element selected from Group 4 (e.g. Ti or Zr), Group 14 (e.g. Si) of the Periodic Table and a lanthanide (e.g. La or Ce). The heteroatom component can be an element, ion or a compound, but it is not alumina and, preferably, it is not a constituent element or ion of alumina (e.g. oxygen, $O^{2-}$, aluminium or $Al^{3+}$).

The modified alumina incorporating a heteroatom component generally comprises, or consists essentially of, an alumina doped with a heteroatom component, an alkaline earth metal aluminate or a mixture thereof. It is preferred that the modified alumina incorporating a heteroatom component comprises, or consists essentially of, an alumina doped with a heteroatom component or an alkaline earth metal aluminate.

When the modified alumina incorporating a heteroatom component is alumina doped with a heteroatom component, then typically the heteroatom component comprises silicon, magnesium, barium, lanthanum, cerium, titanium, or zirconium or a combination of two or more thereof. The heteroatom component may comprises, or consist essentially of, an oxide of silicon, an oxide of magnesium, an oxide of barium, an oxide of lanthanum, an oxide of cerium, an oxide of titanium or an oxide of zirconium. Preferably, the heteroatom component comprises, or consists essentially of, silicon, magnesium, barium, or cerium, or an oxide thereof, particularly silicon, or cerium, or an oxide thereof. More preferably, the heteroatom component comprises, or consists essentially of, silicon, magnesium, or barium, or an oxide thereof; particularly silicon, or magnesium, or an oxide thereof; especially silicon or an oxide thereof.

Examples of alumina doped with a heteroatom component include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a heteroatom component is alumina doped with silica, alumina doped with barium or barium oxide, or alumina doped with magnesium oxide. More preferably, the alumina doped with a heteroatom component is alumina doped with silica or alumina doped with magnesium oxide. Even more preferably, the alumina doped with a heteroatom component is alumina doped with silica. Alumina doped with a heteroatom component can be prepared using methods known in the art or, for example, by a method described in U.S. Pat. No. 5,045,519.

Typically, the alumina doped with a heteroatom component comprises 0.5 to 45% by weight of the heteroatom component, preferably 1 to 40% by weight of the heteroatom component, more preferably 1.5 to 30% by weight of the heteroatom component, particularly 2.5 to 25% by weight of the heteroatom component.

When the alumina doped with a heteroatom component comprises, or consists essentially of, alumina doped with silica, then the alumina is doped with silica in an amount of 0.5 to 45% by weight, preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina doped with a heteroatom component comprises, or consists essentially of, alumina doped with magnesium oxide, then the alumina is doped with magnesium in an amount as defined above or an amount of 5 to 30% by weight, preferably 10 to 25% by weight.

If the heteroatom component comprises, or consists essentially of, an alkaline earth metal, then generally the oxidation catalyst comprises an alkaline earth metal component that is separate to, or is not part of, the modified alumina incorporating a heteroatom component. Thus, the oxidation catalyst includes an alkaline earth metal component in addition to any alkaline earth metal that may be present in the modified alumina.

Generally, when the heteroatom component comprises, or consists essentially of, an alkaline earth metal, then preferably the alkaline earth metal component is different to the heteroatom component. It is preferred that the heteroatom component and the alkaline earth metal component comprise different alkaline earth metals.

If the heteroatom component of the modified alumina comprises an alkaline earth metal, such as when it is a dopant in the alumina doped with a heteroatom component or when it is part of the alkaline earth metal aluminate, then the amount of the "alkaline earth metal component" does not include the amount of any alkaline earth metal that is present as part of the modified alumina. Similarly, the amount of heteroatom component does not include the amount of the alkaline earth metal component that is present. It is possible to control the amounts of each component during manufacture of the oxidation catalyst.

The term "alkaline earth metal aluminate" generally refers to a compound of the formula $MAl_2O_4$ where "M" represents the alkaline earth metal, such as Mg, Ca, Sr or Ba. Such compounds generally comprise a spinel structure. These compounds can be prepared using conventional methods well known in the art or, for example, by using a method described in EP 0945165, U.S. Pat. Nos. 6,217,837 or 6,517,795.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

Generally, when the support material comprises an alkaline earth metal aluminate, then the alkaline earth metal ("M") of the alkaline earth metal aluminate is different to the alkaline earth metal component. It is preferred that the alkaline earth metal aluminate and the alkaline earth metal component comprise different alkaline earth metals.

The oxidation catalyst for use in the invention generally comprises a total amount of support material of 0.1 to 5 g in$^{-3}$, preferably 0.2 to 4 g in$^{-3}$ (e.g. 0.5 to 3.5 g in$^{-3}$). When the oxidation catalyst for use in the present invention comprises a second support material, in addition to the support material comprising the modified alumina, then the total amount refers to the amount of both the second support material and the support material comprising the modified alumina.

The total amount of support material in the oxidation catalyst of the catalysed soot filter is generally 0.2 to 4 g in$^{-3}$.

When the oxidation catalyst for use in the present invention comprises a second support material, then typically the amount of the support material comprising the modified alumina is 0.1 to 3.0 g in$^{-3}$, preferably 0.2 to 2.5 g in$^{-3}$, still more preferably 0.3 to 2.0, and even more preferably 0.5 to 1.75 g in$^{-3}$.

In general, the ratio of the total mass of the alkaline earth metal component to the total mass of the support material comprising the modified alumina is 1:200 to 1:5, preferably 1:150 to 1:10, even more preferably 1:100 to 1:20.

Typically, the support material, particularly the alumina doped with a heteroatom component, is in particulate form. The support material may have a $d_{90}$ particle size of ≤20 μm (as determined by conventional laser diffraction techniques). The particle size distribution of the support material is selected to aid adhesion to the substrate. The particles are generally obtained by milling.

Generally, the support material has a specific surface area of 50 to 500 m$^2$ g$^{-1}$ (measured by BET in accordance with DIN 66131 or after activation at 550° C. for 3 hours). It is preferred that the support material has a specific surface area of 50 to 300 m$^2$ g$^{-1}$, more preferably 100 to 250 m$^2$ g$^{-1}$.

The oxidation catalyst for use in the present invention optionally further comprises a second support material. Typically, the alkaline earth metal component is disposed or supported on the support material comprising the modified alumina and/or a second support material. When the oxidation catalyst for use in the present invention comprises a plurality of layers, then the second support material and the support material comprising the modified alumina are preferably in different layers.

In general, the alkaline earth metal component is disposed or supported on at least one support material that comprises, or consists essentially of, a modified alumina incorporating a heteroatom component. Typically, the catalyst for use in the invention comprises a single support material, which support material comprises, or consists essentially of, the modified alumina incorporating a heteroatom component.

If a second support material is present, especially when the second support material is in the same layer as the first support material, then it is preferred that the alkaline earth metal component is substantially disposed or supported on the support material comprising the modified alumina (the term "substantially" in this context refers to at least 90%, preferably at least 99%, more preferably at least 99%, of the mass of the alkaline earth metal component that is present, typically in the layer or otherwise, is disposed on the support material comprising the modified alumina). It is further preferred that the alkaline earth metal component is only disposed or supported on the support material comprising the modified alumina. For some combinations of support materials in the same layer, it may be difficult to control the precise location of the alkaline earth metal component because of its solubility and the alkaline earth metal component may be disposed or support on all of the support materials.

The oxidation catalyst for use in the present invention also comprises a platinum group metal (PGM) component selected from the group consisting of a platinum (Pt) component, a palladium (Pd) component and a combination thereof. The oxidation catalyst for use in the invention may comprise a single platinum group metal (PGM) component, which is either a platinum (Pt) component or a palladium (Pd) component.

Generally, it is preferred that the oxidation catalyst comprises a platinum (Pt) component and a palladium (Pd) component (i.e. the platinum group metal (PGM) component is a platinum (Pt) component and a palladium (Pd) component). The ratio of the total mass of the platinum (Pt) component to the total mass of the palladium (Pd) component is typically 3:1 to 1:3, preferably 2:1 to 1:2, and more preferably 1.5:1 to 1:1.5, especially when, but not exclusively, the oxidation catalyst comprises a plurality of layers. However, in a particularly preferred embodiment, the total weight ratio of Pt:Pd is 4:1 to 1:1, preferably 2:1 to 1:1.

Typically, the total amount of the platinum group metal (PGM) component (e.g. the total amount of the platinum (Pt) component and/or the palladium (Pd) component) is 5 to 500 g ft$^{-3}$. Preferably, the total amount of the PGM component is 10 to 400 g ft$^{-3}$, more preferably 20 to 300 g ft$^{-3}$, still more preferably, 25 to 250 g ft$^{-3}$, and even more preferably 35 to 200 g ft$^{-3}$.

The total amount of the platinum group metal (PGM) component in the oxidation catalyst for use in the catalysed soot filter according to the invention is 5 to 100 g ft$^{-3}$, more preferably 10 to 40 g ft$^{-3}$.

Typically, the oxidation catalyst comprises a total amount by mass of the platinum group metal (PGM) component of 2.0 to 8.0 g. The total amount of PGM component that is used depends on, amongst other things and the size of the substrate.

In addition to the platinum group metal (PGM) component, the oxidation catalyst for use in the invention may further comprise a noble metal component. The noble metal component comprises a noble metal selected from the group consisting of ruthenium (Ru), rhodium (Rh), iridium (Ir), gold (Au), silver (Ag) and a combination of two or more thereof. It is preferred that the noble metal component comprises a noble metal selected from the group consisting of gold, silver and a combination thereof. More preferably, the noble metal component comprises, or consists of, gold. When the catalyst comprises gold (Au), then a platinum group metal (PGM) component, preferably a palladium (Pd) component, is present as an alloy with gold (Au) (e.g. a palladium-gold alloy). Catalysts comprising gold (Au) can be prepared using the method described in WO 2012/120292 by the present Applicant.

The oxidation catalyst for use in the invention optionally further comprises a hydrocarbon adsorbent. The hydrocarbon adsorbent may be selected from a zeolite, active charcoal, porous graphite and a combination of two or more thereof. It is preferred that the hydrocarbon adsorbent is a zeolite. More preferably, the zeolite is a medium pore zeolite (e.g. a zeolite having a maximum ring size of eight tetrahedral atoms) or a large pore zeolite (e.g. a zeolite having a maximum ring size of ten tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

Typically, the zeolite has a silica to alumina molar ratio of at least 25:1, preferably at least 25:1, with useful ranges of from 25:1 to 1000:1, 50:1 to 500:1 as well as 25:1 to 100:1, 25:1 to 300:1, from 100:1 to 250:1. Zeolites having a high molar ratio of silica to alumina show improved hydrothermal stability.

When the catalyst comprises a hydrocarbon adsorbent, then typically the total amount of hydrocarbon adsorbent is 0.05 to 3.00 g in$^{-3}$, particularly 0.10 to 2.00 g in$^{-3}$, more particularly 0.2 to 0.8 g in$^{-3}$.

The catalyst for use in the invention optionally further comprises an oxygen storage material. Such materials are well-known in the art. The oxygen storage material may be selected from ceria ($CeO_2$) and ceria-zirconia ($CeO_2$—$ZrO_2$), such as a ceria-zirconia solid solution.

Typically, at least one platinum group metal (PGM) component is supported on the support material comprising the modified alumina incorporating a heteroatom component. Thus, a platinum (Pt) component or a palladium (Pd) component or both a platinum (Pt) component and a palladium (Pd) component is supported on the support material.

Generally, the alkaline earth metal component and at least one platinum group metal (PGM) component is supported on the support material comprising the modified alumina incorporating a heteroatom component. Thus, the oxidation catalyst for use in the invention may comprise a palladium (Pd) component and/or a platinum (Pt) component and an alkaline earth metal component supported on the same support material, namely the support material comprising the modified alumina incorporating a heteroatom component. It is preferred that a palladium (Pd) component, a platinum (Pt) component and an alkaline earth metal component are supported on the support material comprising the modified alumina incorporating a heteroatom component.

As mentioned above, the oxidation catalyst may or may not further comprise a second support material. The second support material may be selected from the group consisting of alumina, silica, alumina-silica, zirconia, titania, ceria and a mixture of two or more thereof. The second support material is preferably selected from the group consisting of alumina, silica, zirconia, titania and a mixture of two or more thereof, particularly alumina, silica, titania and a mixture of two or more thereof. More preferably, the second support material comprises, or consists of, alumina.

When the oxidation catalyst for use in the present invention comprises a second support material, then preferably at least one platinum group metal (PGM) component is supported on the second support material. A platinum (Pt) component, a palladium (Pd) component or both a platinum (Pt) component and a palladium (Pd) component may be supported on the second support material.

In addition or as alternative to being supported on the support material comprising the modified alumina, the alkaline earth metal component may be supported on the second support material. However, it is preferred that the alkaline earth metal component is only supported on the support material comprising the modified alumina (i.e. the alkaline earth metal component is not supported on the second support material).

If the oxidation catalyst for use in the present invention comprises a noble metal component and/or an oxygen storage material, then the noble metal component and/or the oxygen storage material may be supported on the support material comprising the modified alumina and/or, if present, the second support material. When the oxidation catalyst for use in the present invention additionally comprises an oxygen storage material and a second support material, then the oxygen storage material and the second support material are different (e.g. the oxygen storage material and the second support material are not both ceria or ceria-zirconia).

Generally, the platinum group metal (PGM) component(s), the alkaline earth metal component, the support material and any optional noble metal component, oxygen storage material, hydrocarbon adsorbent and/or second storage material are disposed or supported on the substrate.

The oxidation catalyst for use in the invention comprises a filtering substrate. However, the oxidation catalyst may be comprised of a plurality of substrates in series (at least one being the filtering substrate according to the first aspect of the invention (e.g. 2, 3 or 4 substrates, at least one being the filtering substrate according to the first aspect of the invention)), more preferably two substrates in series (i.e. only two substrates, at least one being the filtering substrate according to the first aspect of the invention). When there are two substrates, then a first substrate may be in contact with or separate from a second substrate. When the first substrate is separate from the second substrate, then preferably the distance (e.g. the perpendicular distance between faces) between an outlet end (e.g. the face at an outlet end) of the first substrate and inlet end (e.g. the face at an inlet end) of the second substrate is from 0.5 mm to 50 mm, preferably 1 mm to 40 mm, more preferably 1.5 mm to 30 mm (e.g. 1.75 mm to 25 mm), such as 2 mm to 20 mm (e.g. 3 mm to 15 mm), and still more preferably 5 mm to 10 mm.

In general, it is preferred that the catalysed soot filter according to the invention comprises a single filtering substrate (i.e. only one filtering substrate).

Filtering substrates for supporting oxidation catalysts for treating the exhaust gas of a compression ignition engine are well known in the art. Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith. A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the filtering substrate may be of any shape or size. However, the shape and size of the filtering substrate is usually selected to optimise exposure of the catalytically active materials in the catalyst to the exhaust gas. The filtering substrate may, for example, have a tubular, fibrous or particulate form. Examples of suitable supporting filtering substrates include a filtering substrate of the monolithic honeycomb cordierite type, a filtering substrate of the monolithic honeycomb SiC type, a filtering substrate of the layered fibre or knitted fabric type, a filtering substrate of the foam type, a filtering substrate of the crossflow type, a filtering substrate of the metal wire mesh type, a filtering substrate of the metal porous body type and a filtering substrate of the ceramic particle type.

Generally, the oxidation catalyst for use in the invention comprises a single layer or a plurality of layers (e.g. 2, 3 or 4 layers) disposed on the substrate. Typically, each layer is formed by applying a washcoat coating onto the substrate. However, preferably the filtering substrate is a filtering monolith, particularly preferably a wallflow filter substrate, and the oxidation catalyst for use in the invention comprises a single layer on inlet channels thereof and a single layer on outlet channels.

The oxidation catalyst for use in the invention may comprise, or consist of, a filtering substrate and a single layer disposed on the filtering substrate, wherein the single layer comprises a platinum group metal (PGM) component selected from the group consisting of a platinum (Pt) component, a palladium (Pd) component and a combination thereof; an alkaline earth metal component; and the support material comprising the modified alumina incorporating a heteroatom component. The single layer may further comprise a noble metal component and/or an oxygen storage material and/or a hydrocarbon adsorbent and/or a second storage material. It is preferred that the single layer further comprises a hydrocarbon adsorbent and optionally an oxygen storage material.

When the oxidation catalyst for use in the present invention comprises, or consists of, a filtering substrate and a single layer disposed on the filtering substrate, then preferably the single layer comprises a platinum (Pt) component and a palladium (Pd) component (i.e. the platinum group metal (PGM) component is a platinum (Pt) component and a palladium (Pd) component). When the single layer comprises a platinum (Pt) component and a palladium (Pd) component, then the relative amount of the platinum (Pt) component to the palladium (Pd) component can vary.

Typically, the ratio by mass of the platinum (Pt) component to the palladium (Pd) component is ≥35:65 (e.g. ≥7:13). It is preferred that the ratio by mass of the platinum (Pt) component to the palladium (Pd) component is ≥40:60 (e.g. ≥2:3), more preferably ≥42.5:57.5 (e.g. ≥17:23), particularly ≥45:55 (e.g. ≥9:11), such as ≥47.5:52.5 (e.g. ≥19:21), and still more preferably ≥50:50 (e.g. ≥1:1). The ratio by mass (i.e. mass ratio) of the platinum (Pt) component to the palladium (Pd) component is typically 80:20 to 35:65 (e.g. 4:1 to 7:13). It is preferred that the ratio by mass of the platinum (Pt) component to the palladium (Pd) component is 75:25 to 40:60 (e.g. 3:1 to 2:3), more preferably 70:30 to 42.5:57.5 (e.g. 7:3 to 17:23), even more preferably 67.5:32.5 to 45:55 (e.g. 27:13 to 9:11), such as 65:35 to 47.5:52.5 (e.g. 13:7 to 19:21), and still more preferably 60:40 to 50:50 (e.g. 3:2 to 1:1). Particularly preferred is a ratio by mass of the Pt component to the Pd component of 4:1 to 1:1, preferably 2:1 to 1:1.

It is thought that oxidation catalysts for use in the present invention where the mass of the palladium (Pd) component is less than the mass of the platinum (Pt) component have advantageous activity. Thus, the catalyst of the invention preferably comprises the platinum (Pt) component and the palladium (Pd) component in a ratio by mass of 65:35 to 52.5:47.5 (e.g. 13:7 to 21:19), more preferably 60:40 to 55:45 (e.g. 3:2 to 11:9).

Typically, the ratio by mass (i.e. mass ratio) of the alkaline earth metal component to the platinum group metal (PGM) component is 0.25:1 to 20:1. It is preferred that the mass ratio of the alkaline earth metal component to the platinum group metal (PGM) component is 0.5:1 to 17:1, more preferably 1:1 to 15:1, particularly 1.5:1 to 10:1, still more preferably 2:1 to 7.5:1, and even more preferably 2.5:1 to 5:1.

Alternatively, the oxidation catalyst for use in the present invention can comprise a plurality of layers, such as 2, 3 or 4 layers.

When there is a plurality of layers, then the oxidation catalyst may comprise a plurality of substrates (at least one being the filtering substrate according to the first aspect of the invention), preferably two substrates (at least one being the filtering substrate according to the first aspect of the invention). When there is a plurality of substrates (at least one being the filtering substrate according to the first aspect of the invention (e.g. two substrates)), then in one embodiment a first layer is disposed on a first substrate and a second layer is disposed on a second substrate. Thus, any reference below to the first layer being disposed on the substrate may refer to the first layer being disposed on the first substrate. Similarly, any reference below to the second layer being disposed on the second substrate may refer to the second layer being disposed on the second substrate.

When there is a plurality of substrates (at least one being the filtering substrate according to the first aspect of the invention), then the first substrate may be upstream of the second substrate. Alternatively, the second substrate may be upstream of the first substrate.

In general, it is preferred that the catalysed soot filter according to the invention comprises a single filtering substrate, particularly when the oxidation catalyst comprises a plurality of layers.

When there is a plurality of layers, then generally a first layer is disposed on the filtering substrate (e.g. the first layer is preferably disposed directly on the substrate, such that the first layer is in contact with a surface of the substrate). The first layer may be disposed on a third layer or a fourth layer. It is preferable that the first layer is disposed directly on the filtering substrate.

A second layer may be disposed on the filtering substrate (e.g. to form a zone as described below, which is separate from, or partly overlaps with, the first layer) or the second layer may be disposed on the first layer.

When the second layer is disposed on the first layer, it may completely or partly overlap (i.e. cover) the first layer. If the catalyst comprises a third layer, then the third layer may be disposed on the second layer and/or the first layer, preferably the third layer is disposed on the first layer. If the catalyst comprises a fourth layer, then the fourth layer may be disposed on the third layer and/or the second layer.

When the second layer is disposed on the filtering substrate (e.g. to form a zone), then the second layer may be disposed directly on the filtering substrate (i.e. the second layer is in contact with a surface of the filtering substrate) or it may be disposed on a third layer or a fourth layer.

The first layer may be a zone (e.g. a first zone) and/or the second layer may be a zone (e.g. a second zone). For the avoidance of doubt, features described herein relating to the "first layer" and "second layer", especially the composition of the "first layer" and the "second layer", also relate to the "first zone" and "second zone" respectively.

The first layer may be a first zone and the second layer may be a second zone, such as when the first zone and second zone are side-by-side on the same filtering substrate or the first zone is disposed on a first substrate and a second zone is disposed on a second substrate (i.e. the first substrate and the second substrate are different) and the first substrate and second substrate are side-by-side. Preferably, the first zone and second zone are disposed on the same filtering substrate.

The first zone may be upstream of the second zone. When the first zone is upstream of the second zone, inlet exhaust gas will contact the first zone before the second zone. Alternatively, the second zone may be upstream of the first zone. Similarly, when the second zone is upstream of the first zone, inlet exhaust gas will contact the second zone before the first zone.

When the first zone and the second zone are disposed on the same filtering substrate, then the first zone may abut the second zone or the first zone may be separate from the second zone. If the first zone abuts the second zone, then preferably the first zone is in contact with the second zone. When the first zone is separate from the second zone, then typically there is a gap or space between the first zone and the second zone.

Typically, the first zone has a length of 10 to 80% of the length of the filtering substrate (e.g. 10 to 45%), preferably 15 to 75% of the length of the filtering substrate (e.g. 15 to 40%), more preferably 20 to 60% (e.g. 25 to 45%) of the length of the filtering substrate, still more preferably 25 to 50%.

The second zone typically has a length of 10 to 80% of the length of the filtering substrate (e.g. 10 to 45%), preferably 15 to 75% of the length of the filtering substrate (e.g. 15 to 40%), more preferably 20 to 60% (e.g. 25 to 45%) of the length of the filtering substrate, still more preferably 25 to 50%.

An oxidation catalyst for use in the present invention comprises two layers (e.g. only two layers), wherein a first layer is disposed on the substrate and a second layer is disposed on the first layer.

Typically, the second layer completely or partly overlaps the first layer.

The first layer and the second layer may have different lengths, or the first layer and the second layer may have about the same length. Generally, the length of the first layer and the length of the second layer is each substantially uniform.

The first layer typically extends for substantially an entire length of the channels in the substrate, particularly when the filtering substrate is a monolith.

In an oxidation catalyst for use in the present invention comprising a plurality of layers, the second layer may be arranged in a zone of substantially uniform length at a downstream end of the filtering substrate. It is preferred that the zone at the downstream end is nearer to the outlet end of the filtering substrate than to the inlet end. Methods of making differential length layered coatings are known in the art (see for example WO 99/47260 by the present Applicant).

When the oxidation catalyst for use in the present invention comprises a plurality of layers, then the platinum group metal (PGM) component, the alkaline earth metal component and the support material comprising the modified alumina can be distributed amongst the layers in a variety of ways.

In general, the first layer (or first zone) comprises a platinum group metal (PGM) component selected from the group consisting of a platinum (Pt) component, a palladium (Pd) component and a combination thereof, and the second layer (or second zone) comprises a platinum group metal (PGM) component selected from the group consisting of a platinum (Pt) component, a palladium (Pd) component and a combination thereof. It is preferred that the first layer/zone is different (e.g. in composition) to the second layer/zone. For example, the first and second layers/zones may comprise different platinum group metal (PGM) components and/or the first and second layers/zones may comprise a different total amount of the platinum group metal (PGM) component.

In a first embodiment, the first layer (or first zone) comprises a PGM component selected from the group consisting of a Pd component and a combination of (i.e. both) a Pd component and a Pt component, and the second layer (or second zone) comprises a PGM component consisting of a Pt component. This means that the first layer/zone comprises a Pd component and optionally a Pt component as the only PGM component and the second layer/zone comprises a Pt component as the only PGM component. Preferably, the first layer/zone comprises a PGM component consisting of a combination of (i.e. both) a Pd component and a Pt component. Thus, it is preferred that the first layer/zone comprises both a Pt component and a Pd component as the only PGM component, and the second layer/zone comprises a Pt component as the only PGM component.

Typically, in the first embodiment, the first layer (or first zone) further comprises the alkaline earth metal component and the support material comprising a modified alumina incorporating a heteroatom component, and/or the second layer (or second zone) further comprises the alkaline earth metal component and the support material comprising a modified alumina incorporating a heteroatom component. It is preferred that the first layer/zone further comprises the alkaline earth metal component and the support material comprising a modified alumina incorporating a heteroatom component.

When the first layer/zone comprises a Pd component as the only PGM component, then the first layer/zone may comprise a second support material. Preferably the second support material is ceria, ceria-zirconia, alumina or silica-alumina. The second support material may be ceria. The second support material may be ceria-zirconia. The second support material may be alumina. The second support material may be silica-alumina. More preferably, the first layer/zone comprises a PGM component selected from the group consisting of a Pd component, and a second support material, wherein the second support material is ceria.

In a second embodiment, the first layer (or first zone) comprises a PGM component selected from the group consisting of a Pt component and a combination of (i.e. both) a Pd component and a Pt component, and the second layer (or second zone) comprises a PGM component consisting of a Pd component. This means that the first layer/zone comprises a Pt component and optionally a Pd component as the only PGM component and the second layer/zone comprises a Pd component as the only PGM component. Preferably, the first layer/zone comprises a PGM component consisting of a combination of (i.e. both) a Pd component and a Pt component. Thus, it is preferred that the first layer/zone comprises both a Pt component and a Pd component as the only PGM component, and the second layer/zone comprises a Pd component as the only PGM component. Typically, the amount of the Pt component in the first layer/zone is greater than the amount of the Pd component in the first layer/zone (the amount being measured in g ft$^{-3}$ or as a molar amount).

In the second embodiment, the first layer (or first zone) may further comprise the alkaline earth metal component and the support material comprising a modified alumina incorporating a heteroatom component, and/or the second layer (or second zone) may further comprise the alkaline earth metal component and the support material comprising a modified alumina incorporating a heteroatom component. It is preferred that the first layer/zone further comprises the alkaline earth metal component and the support material comprising a modified alumina incorporating a heteroatom component.

In the second embodiment, the second layer/zone typically comprises a second support material. Preferably the second support material is ceria, ceria-zirconia, alumina or silica-alumina. The second support material may be ceria. The second support material may be ceria-zirconia. The second support material may be alumina. The second support material may be silica-alumina.

In a third embodiment, the first layer (or first zone) comprises a PGM component selected from the group consisting of a Pt component and a Pd component, and the second layer (or second zone) comprises a PGM component consisting of a combination of (i.e. both) a Pd component and a Pt component. This means that the first layer/zone comprises a Pt component or a Pd component as the only PGM component, and the second layer/zone comprises a Pt component and a Pd component as the only PGM component. Preferably, the first layer/zone comprises a PGM component consisting of a Pt component. Thus, it is preferred that the first layer/zone comprises a Pt component as the only PGM component, and the second layer/zone comprises a Pt component and a Pd component as the only PGM component.

In the third embodiment, when the first layer/zone comprises a Pt component as the only PGM component, then typically the ratio by mass of the Pt component in the second layer/zone to the Pd component in the second layer/zone is ≤2:1, preferably <2:1. When the first layer/zone comprises a Pd component as the only PGM component, then typically the amount of the Pd component in the second layer/zone is less than the amount of the Pt component in the second layer/zone (the amount being measured in g ft$^{-3}$ or is a molar amount).

Typically, in the third embodiment, the first layer (or first zone) further comprises the alkaline earth metal component and the support material comprising a modified alumina incorporating a heteroatom component, and/or the second layer (or second zone) further comprises the alkaline earth metal component and the support material comprising a modified alumina incorporating a heteroatom component. When the first layer/zone comprises a Pt component as the only PGM component, then it is preferred that the first layer/zone further comprises the alkaline earth metal component and the support material comprising a modified alumina incorporating a heteroatom component. When the first layer/zone comprises a Pd component as the only PGM component, then it is preferred that the second layer/zone further comprises the alkaline earth metal component and the support material comprising a modified alumina incorporating a heteroatom component.

In the third embodiment, when the first layer/zone comprises a Pd component as the only PGM component, then the first layer/zone may comprise a second support material. Preferably the second support material is ceria, ceria-zirconia, alumina or silica-alumina. The second support material may be ceria. The second support material may be ceria-zirconia. The second support material may be alumina. The second support material may be silica-alumina.

In a fourth embodiment, the first layer (or first zone) comprises a PGM component consisting of a combination of (i.e. both) a Pt component and a Pd component, and the second layer (or second zone) comprises a PGM component consisting of a combination of (i.e. both) a Pd component and a Pt component. This means that first layer/zone comprises a Pt component and a Pd component as the only PGM component, and the second layer/zone comprises a Pt component or a Pd component as the only PGM component. In the fourth embodiment, the first layer/zone and second layer/zone typically comprise a different ratio by mass of the Pt component to the Pd component. Thus, the ratio by mass of the Pt component to the Pd component in the first layer/zone is different to the ratio by mass of the Pt component to the Pd component in the second/zone layer.

In the fourth embodiment, when the amount of the Pd component in the first layer/zone is less than the amount of the Pt component in the first layer/zone (the amount being measured in g ft$^{-3}$ or is a molar amount), then preferably the amount of the Pd component in the second layer/zone is greater than the amount of the Pt component in the second layer/zone. Alternatively, when the amount of the Pd component in the first layer/zone is greater than the amount of the Pt component in the first layer/zone (the amount being measured in g ft$^{-3}$ or is a molar amount), then preferably the amount of the Pd component in the second layer/zone is less than the amount of the Pt component in the second layer/zone.

Generally, the ratio by mass of the platinum (Pt) component to the palladium (Pd) component, particularly in first layer/zone of the first or second embodiments, the second layer/zone of the third embodiment, or the first layer/zone and/or second layer/zone of the fourth embodiment, preferably the second layer/zone of the fourth embodiment, is ≥35:65 (e.g. ≥7:13). It is preferred that the ratio by mass of the platinum (Pt) component to the palladium (Pd) component is ≥40:60 (e.g. ≥2:3), more preferably ≥42.5:57.5 (e.g. ≥17:23), particularly ≥45:55 (e.g. ≥9:11), such as ≥47.5:52.5 (e.g. ≥19:21), and still more preferably ≥50:50 (e.g. ≥1:1).

It is preferred that the ratio by mass of the platinum (Pt) component to the palladium (Pd) component, particularly in first layer/zone of the first or second embodiments, the second layer/zone of the third embodiment, or the first layer/zone and/or second layer/zone of the fourth embodiment, preferably the second layer/zone of the fourth embodiment, is 80:20 to 35:65 (e.g. 4:1 to 7:13), particularly 75:25 to 40:60 (e.g. 3:1 to 2:3), more preferably 70:30 to 42.5:57.5 (e.g. 7:3 to 17:23), even more preferably 67.5:32.5 to 45:55 (e.g. 27:13 to 9:11), such as 65:35 to 47.5:52.5 (e.g. 13:7 to 19:21), and still more preferably 60:40 to 50:50 (e.g. 3:2 to 1:1). For the second layer of the third embodiment, it is particularly preferable that the ratio by mass of the platinum (Pt) component to the palladium (Pd) component is 2:1 to 7:13, particularly 13:7 to 2:3, more preferably 60:40 to 50:50 (e.g. 3:2 to 1:1)

It is thought that oxidation catalysts for use in the present invention where the mass of the palladium (Pd) component is less than the mass of the platinum (Pt) component have advantageous activity, especially when both a platinum (Pt) component, a palladium (Pd) component and an alkaline earth metal component are present in the same layer/zone. Thus, in the first layer/zone of the first embodiment, the first layer/zone of the second embodiment, the second layer/zone of the third embodiment, or the first layer/zone and/or second layer/zone of the fourth embodiment, preferably the second layer/zone of the fourth embodiment, the oxidation catalyst of the invention preferably comprises the platinum (Pt) component and the palladium (Pd) component in a ratio by mass of 65:35 to 52.5:47.5 (e.g. 13:7 to 21:19), more preferably 60:40 to 55:45 (e.g. 3:2 to 11:9).

In a fifth embodiment, the first layer (or first zone) comprises a PGM component selected from the group consisting of a Pt component and a Pd component, and the second layer (or second zone) comprises a PGM component selected from the group consisting of a Pd component and a Pt component, and wherein the first and second layer/zone each comprise the same PGM component. This means that the first layer/zone and the second layer/zone each comprise a Pt component or a Pd component as the only PGM component. Typically, the total amount of PGM component in the first layer/zone is different to the total amount of PGM component in the second layer/zone.

When both the first layer/zone and the second layer/zone each comprise a Pd component as the only PGM component, then preferably the first layer/zone comprises a second support material and/or the second layer/zone comprises a second support material. It is preferred that the second support material is ceria, ceria-zirconia, alumina or silica-alumina. The second support material may be ceria. The second support material may be ceria-zirconia. The second support material may be alumina. The second support material may be silica-alumina.

In the first to fifth embodiments, the first layer/zone may comprise an alkaline earth metal component and/or the second layer/zone may comprise an alkaline earth metal component. When the first layer/zone comprises the alkaline earth metal component, the second layer/zone may not comprise an alkaline earth metal component. Alternatively, when the second layer/zone comprises the alkaline earth metal component, the first layer/zone may not comprise an alkaline earth metal component.

In the first to fifth embodiments, the first layer/zone may comprise the support material comprising the modified alumina, and/or the second layer/zone may comprise the support material comprising the modified alumina. Typically, it is preferred that a layer or zone comprising a platinum (Pt) component also comprises the support material comprising the modified alumina.

In the first to fifth embodiments, the first layer/zone may comprise a second support material and/or the second layer/zone may comprise a second support material. The first layer/zone and the second layer/zone may comprise different support materials. It is preferred that the second support material and the support material comprising the modified alumina are in different layers/zones.

In general, the alkaline earth metal component and the support material comprising the modified alumina are present in at least one of the same layers/zones.

When the first layer/zone comprises the alkaline earth metal component, then typically the ratio of the mass of the alkaline earth metal component to the mass of the platinum group metal (PGM) component in the first layer is 0.25:1 to 20:1, preferably 0.5:1 to 17:1, more preferably 1:1 to 15:1, particularly 1.5:1 to 10:1, still more preferably 2:1 to 7.5:1, and even more preferably 2.5:1 to 5:1.

When the second layer/zone comprises the alkaline earth metal component, then typically the ratio of the mass of the alkaline earth metal component to the mass of the platinum group metal (PGM) component in the second layer is 0.25:1 to 20:1, preferably 0.5:1 to 17:1, more preferably 1:1 to 15:1, particularly 1.5:1 to 10:1, still more preferably 2:1 to 7.5:1, and even more preferably 2.5:1 to 5:1.

In the first to fifth embodiments, the first layer/zone may optionally further comprise a noble metal component and/or an oxygen storage material and/or a hydrocarbon adsorbent. Preferably, the first layer/zone further comprises a hydrocarbon adsorbent.

In the first to fifth embodiments, the second layer/zone may optionally further comprise a noble metal component and/or an oxygen storage material and/or a hydrocarbon adsorbent. Preferably, the second layer/zone further comprises a hydrocarbon adsorbent.

In one arrangement of the first embodiment, the first layer/zone typically comprises a Pd component, a Pt component, an alkaline earth metal component and the support material comprising the modified alumina; and the second layer/zone comprises a Pt component and either a second support material or a support material comprising the modified alumina, and optionally an alkaline earth metal component. When the second layer/zone comprises a second support material, then preferably the second support material is alumina.

In one arrangement of the fourth embodiment, the first layer/zone comprises a Pt component, a Pd component, an alkaline earth metal component and the support material comprising the modified alumina; and the second layer/zone comprises a Pt component, a Pd component and either a second support material or a support material comprising the modified alumina, and optionally an alkaline earth metal component. It is preferred that the ratio by mass of the Pt component in the second layer/zone to the Pd component in the second layer is ≤10:1 (e.g. 10:1 to 1:2), more preferably ≤15:2 (e.g. 7.5:1 to 1:1.5), and still more preferably ≤5:1 (e.g. 5:1 to 1.5:1). When the second layer/zone comprises a second support material, then preferably the second support material is alumina.

When the first layer is a first zone and the second layer is a second zone, then (a) in the first and third embodiments it is preferred that the first layer/zone is upstream of the second layer/zone, (b) in the second embodiment it is preferred that the second layer/zone is upstream of the first layer/zone, and (c) in the fifth embodiment it is preferred that the layer/zone comprising the second support material is upstream of the layer/zone comprising the support material comprising the modified alumina.

In embodiments where there is a second support material, especially when the second support material is either ceria or ceria-zirconia, then it may be advantageous to arrange the layer or zone comprising the second support material to contact the exhaust gas after the other layer or zone. Thus, when there is a second support material, especially when the second support material is ceria or ceria-zirconia, it is preferred that (a) in the first and third embodiments it is preferred that the first layer/zone is downstream of the second layer/zone, (b) in the second embodiment it is preferred that the second layer/zone is downstream of the first layer/zone, and (c) in the fifth embodiment it is preferred that the layer/zone comprising the second support material is downstream of the layer/zone comprising the support material comprising the modified alumina.

In general, the oxidation catalyst of the invention may or may not comprise rhodium. It is preferred that the oxidation catalyst does not comprise ruthenium, rhodium, and iridium.

Another general feature of the oxidation catalyst for use in the invention is that when any cerium or ceria is present, then typically only the heteroatom component of the support material comprises the cerium or ceria. It is further preferred that the oxidation catalyst of the invention does not comprise ceria, particularly as a support material or as an oxygen storage material.

A further general feature of the oxidation catalyst of the invention is that when an alkali metal, particularly sodium or potassium, and especially potassium, is present, then preferably only the hydrocarbon adsorbent comprises the alkali metal, especially when the hydrocarbon adsorbent is a zeolite. It is further preferred that the oxidation catalyst for use in the invention does not comprise an alkali metal, particularly sodium or potassium.

Another general feature of the invention is that the oxidation catalyst for use in the invention does not comprise a $NO_x$ adsorber composition. Thus, it is preferred that the oxidation catalyst of the invention is not a $NO_x$ adsorber catalyst (also known as a $NO_x$ trap) or is not for use as a $NO_x$ adsorber catalyst.

The first aspect of the invention relates to a catalysed soot filter comprising an oxidation catalyst as defined above. The second aspect of the invention relates to an exhaust system for a compression ignition engine, such as a diesel engine, which system comprises the catalysed soot filter as defined above. The fifth aspect of the invention relates to the use of the catalysed soot filter. The advantageous activity of the oxidation catalyst for use in the invention, particularly its low CO "light off" temperature, render it particularly suited for use in combination with certain other emissions control devices.

The second aspect of the invention relates to an exhaust system comprising a catalysed soot filter according to the invention. Typically, the exhaust system according to the invention may further comprise, or the catalysed soot filter is for use in combination with, at least one emissions control device, preferably disposed on a separate substrate monolith located either upstream or downstream of the CSF according to the invention. The emissions control device may be selected from a diesel particulate filter (DPF) (i.e. an uncatalysed filter, which may be a bare filter or a filter washcoated with a non-catalytic washcoat, e.g. alumina or as described hereinbelow), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a filter catalysed with a selective catalytic reduction catalyst, an ammonia slip catalyst (ASC) and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and filters catalysed with a selective catalytic reduction catalyst are all well known in the art.

A highly preferred exhaust system according to the present invention comprises a diesel oxidation catalyst (DOC) disposed on a separate flow-through substrate monolith, which is disposed upstream of the catalysed soot filter. The diesel oxidation catalyst formulation can be an oxidation catalyst described herein, i.e. a platinum group metal (PGM) component selected from the group consisting of a platinum (Pt) component, a palladium (Pd) component and a combination thereof; an alkaline earth metal component; a support material comprising a modified alumina incorporating a heteroatom component. However, it is preferred to use a DOC composition which is active for NO oxidation thereby producing $NO_2$ for passive combustion of particulate matter trapped on the downstream CSF device, according to the well-known CRT® technology effect, i.e. $NO_2 + C \rightarrow CO + NO$. Therefore in order to promote NO oxidation, low alkaline earth loadings are preferred, or in one embodiment, the upstream DOC contains substantially no alkaline earth metal. Such "no-alkaline earth metal" DOC can otherwise have a composition as described for the oxidation catalyst herein.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

Examples of emissions control devices for use with the catalysed soot filter according to the invention or for inclusion in the exhaust system of the invention are provided below.

The catalyst formulation of the diesel particulate filter may be a $NO_x$ adsorber composition. When the catalyst formulation is a $NO_x$ adsorber composition, the emissions control device is an example of a $NO_x$ adsorber catalyst (NAC). Emissions control devices where the catalyst formulation is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb $NO_x$ from lean exhaust gas (lambda >1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

Modern $NO_x$ absorber catalysts coated on honeycomb flow-through monolith substrates are typically arranged in layered arrangements. However, multiple layers applied on a filter substrate can create backpressure problems. It is highly preferable, therefore, if the $NO_x$ absorber catalyst for use in the present invention is a "single layer" $NO_x$ absorber catalyst. Particularly preferred "single layer" $NO_x$ absorber catalysts comprise a first component of rhodium supported on a ceria-zirconia mixed oxide or an optionally stabilised alumina (e.g. stabilised with silica or lanthana or another rare earth element) in combination with second components which support platinum and/or palladium. The second components comprise platinum and/or palladium supported on an alumina-based high surface area support and a particulate "bulk" ceria ($CeO_2$) component, i.e. not a soluble ceria supported on a particulate support, but "bulk" ceria capable of supporting the Pt and/or Pd as such. The particulate ceria comprises a $NO_x$ absorber component and supports an alkaline earth metal and/or an alkali metal, preferably barium, in addition to the platinum and/or palladium. The alumina-based high surface area support can be magnesium aluminate e.g. $MgAl_2O_4$, for example.

The preferred "single layer" NAC composition comprises a mixture of the rhodium and platinum and/or palladium support components. These components can be prepared separately, i.e. pre-formed prior to combining them in a mixture, or rhodium, platinum and palladium salts and the supports and other components can be combined and the rhodium, platinum and palladium components hydrolysed preferentially to deposit onto the desired support.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. Preferably, a substrate monolith comprising the SCR catalyst or filter comprising the SCR catalyst is disposed downstream of the CSF according to the invention (or, in the preferred embodiment, the combination of DOC+CSF). When the exhaust system of the invention comprises an SCR catalyst, then the exhaust system may further comprise an injector for injecting a nitrogenous reductant, such as ammonia or an ammonia precursor such as urea or ammonium formate, preferably urea, into exhaust gas downstream of the catalyst for oxidising carbon monoxide (CO) and hydrocarbons (HCs) and upstream of the SCR catalyst. Such injector is fluidly linked to a source of such nitrogenous reductant precursor, e.g. a tank thereof, and valve-controlled dosing of the precursor into the exhaust stream is regulated by suitably programmed engine management means and closed loop or open loop feedback provided by sensors monitoring relevant exhaust gas composition. Ammonia can also be generated by heating ammonium carbamate (a solid) and the ammonia generated can be injected into the exhaust gas.

Alternatively or in addition to the injector, ammonia can be generated in situ e.g. during rich regeneration of a NAC disposed upstream of the filter or by contacting a DOC disposed upstream of the filter with engine-derived rich exhaust gas (see the alternatives to reactions (4) and (5) hereinabove).

SCR catalysts for use in the present invention promote the reactions selectively $4NH_3+4NO+O_2 \rightarrow 4N_2+6H_2O$ (i.e. 1:1 $NH_3:NO$); $4NH_3+2NO+2NO_2 \rightarrow 4N_2+6H_2O$ (i.e. 1:1 $NH_3:NO_x$; and $8NH_3+6NO_2 \rightarrow 7N_2+12H_2O$ (i.e. 4:3 $NH_3:NO_x$) in preference to undesirable, non-selective side-reactions such as $2NH_3+2NO_2 \rightarrow N_2O+3H_2O+N_2$.

The SCR catalyst may comprise a metal selected from the group consisting of at least one of Cu, Hf, La, Au, In, V, lanthanides and Group VIII transition metals, such as Fe, which metal is supported on a refractory oxide or molecular sieve. Particularly preferred metals are Ce, Fe and Cu and combinations of any two or more thereof.

The refractory oxide may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$, $WO_x/CeZrO_2$, $WO_x/ZrO_2$ or $Fe/WO_x/ZrO_2$.

It is particularly preferred when an SCR catalyst or washcoat thereof comprises at least one molecular sieve, such as an aluminosilicate zeolite or a SAPO. The at least one molecular sieve can be a small, a medium or a large pore molecular sieve, for example. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452.

Preferred molecular sieves with application as SCR catalysts in the present invention are synthetic aluminosilicate zeolite molecular sieves selected from the group consisting of AEI, ZSM-5, ZSM-20, ER1 including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

At its most basic, an ammonia slip catalyst (ASC) can be an oxidation catalyst for oxidising ammonia which slips past an upstream SCR or SCR catalysed filter unreacted. The desired reaction (simplified) can be represented by $4NO+4NH_3+O_2 \rightarrow 4N_2+6H_2O$. Ammonia is a strong smelling compound and potential irritant to animal mucosal surfaces, e.g. eyes and respiratory pathways, and so its emission to atmosphere should be limited so far as possible. Possible ammonia slip catalysts include relatively low loaded platinum group metals, preferably including Pt e.g. 1-15 $g/ft^3$, on a suitable relatively high surface area oxide support, e.g. alumina coated on a suitable substrate monolith.

In a particularly preferred arrangement, however, the platinum group metal and the support material (e.g. comprising a modified alumina incorporating a heteroatom component) is disposed on a substrate (i.e. substrate monolith) in a first layer below an upper, second layer overlying the first layer. The second layer is a SCR catalyst, selected from any of those mentioned hereinabove, particularly molecular sieves containing transition metals, such as Cu or Fe. A particularly preferred ASC in the layered arrangement comprises CuCHA in the second or upper layer.

In a first exhaust system embodiment, the exhaust system comprises the catalysed soot filter according to the invention with a substrate monolith disposed upstream comprising a DOC. Such an arrangement may be called a DOC/CSF. The oxidation catalyst is typically followed by (e.g. is upstream of) the catalysed soot filter (CSF). Thus, for example, an outlet of the oxidation catalyst is connected to an inlet of the catalysed soot filter.

The first exhaust system embodiment may further comprise a lean $NO_x$ catalyst (LNC). Thus, the embodiment further relates to the use of the oxidation catalyst for treating an exhaust gas from a compression ignition engine in combination with a $NO_x$ adsorber catalyst (NAC) and the catalysed soot filter (CSF) according to the invention. Typically, a DOC is followed by (e.g. is upstream of) the $NO_x$ adsorber catalyst (NAC), and the $NO_x$ adsorber catalyst (NAC) is followed by (e.g. is upstream of) the catalysed soot filter (CSF) according to the invention. Generally, the DOC, the $NO_x$ adsorber catalyst (NAC) and the catalysed soot filter (CSF) are connected in series. Thus, for example, an outlet of the DOC is connected to an inlet of the $NO_x$ adsorber catalyst (NAC), and an outlet of the $NO_x$ adsorber catalyst is connected to an inlet of the catalysed soot filter (CSF) according to the invention. Such an arrangement may be termed a DOC/NAC/CSF.

In a second exhaust system embodiment, the exhaust system comprises a diesel oxidation catalyst and the catalysed soot filter (CSF) of the invention. This arrangement may also be called a DOC/CSF arrangement. The embodiment further relates to the use of the catalysed soot filter according to the invention for treating an exhaust gas from a compression ignition engine in combination with a diesel oxidation catalyst (DOC). Typically, the diesel oxidation catalyst (DOC) is followed by (e.g. is upstream of) the catalysed soot filter according to the invention. Thus, an outlet of the diesel oxidation catalyst is connected to an inlet of the catalysed soot filter of the invention.

A third exhaust system embodiment relates to an exhaust system comprising a DOC, a catalysed soot filter (CSF) according to the invention and a selective catalytic reduction (SCR) catalyst. Such an arrangement may be called a DOC/CSF/SCR and can be for use in a heavy duty diesel vehicle or a light duty diesel vehicle, preferably an exhaust system for a light-duty diesel vehicle. This embodiment also relates to the use of the catalysed soot filter of the invention for treating an exhaust gas from a compression ignition engine in combination with a diesel oxidation catalyst (DOC) and a selective catalytic reduction (SCR) catalyst. The diesel oxidation catalyst (DOC) is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

A fourth exhaust system embodiment relates to an exhaust system comprising a $NO_x$ adsorber catalyst (NAC), the catalysed soot filter of the invention and a selective catalytic reduction (SCR) catalyst. This is also a NAC/CSF/SCR arrangement. A further aspect of this embodiment relates to the use of the catalysed soot filter for treating an exhaust gas from a compression ignition engine in combination with a $NO_x$ adsorber catalyst (NAC) and a selective catalytic reduction (SCR) catalyst. The $NO_x$ adsorber catalyst (NAC) is typically followed by (e.g. is upstream of) the catalysed soot filter of the invention. The catalysed soot filter of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. Alternatively, or additionally to the nitrogenous reductant injector, ammonia can be generated in situ e.g. during rich regeneration of a NAC disposed upstream of the filter.

In a fifth exhaust system embodiment, the exhaust system comprises the oxidation catalyst of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the oxidation catalyst for treating an exhaust gas from a compression ignition engine in combination with a selective catalytic reduction (SCR) catalyst and either a catalysed soot filter (CSF) or a diesel particulate filter (DPF), preferably wherein the oxidation catalyst is, or is for use as, a diesel oxidation catalyst.

In the fifth exhaust system embodiment, the catalysed soot filter of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalysed soot filter of the invention may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) of the invention.

A sixth exhaust system embodiment comprises the catalysed soot filter of the invention and a filter comprising a selective catalytic reduction catalyst. Such an arrangement may be called a CSF/SCR Filter. This embodiment also relates to the use of the catalysed soot filter for treating an exhaust gas from a compression ignition engine in combination with a selective catalytic reduction filter catalyst. The catalysed soot filter of the invention is typically followed by (e.g. is upstream of) the selective catalytic reduction filter catalyst. A nitrogenous reductant injector may be arranged between the catalysed soot filter of the invention and the selective catalytic reduction filter catalyst. Thus, the catalysed soot filter of the invention may be followed by (e.g. is upstream of) a nitrogenous reductant injector, and the nitrogenous reductant injector may be followed by (e.g. is upstream of) the selective catalytic reduction filter catalyst.

In a seventh exhaust system embodiment, the exhaust system comprises a $NO_x$ adsorber catalyst (NAC) and the catalysed soot filter (CSF) of the invention. This arrangement may also be called a NAC/CSF arrangement. The embodiment further relates to the use of the catalysed soot filter for treating an exhaust gas from a compression ignition engine in combination with a $NO_x$ adsorber catalyst (NAC). Typically, the catalysed soot filter (CSF) is downstream of the $NO_x$ adsorber catalyst (NAC). Thus, an outlet of the $NO_x$ adsorber catalyst (NAC) is connected to an inlet of the catalysed soot filter of the invention.

The seventh exhaust system embodiment may further comprise a selective catalytic reduction (SCR) catalyst. Thus, the embodiment further relates to the use of the catalysed soot filter for treating an exhaust gas from a compression ignition engine in combination with a $NO_x$ adsorber catalyst (NAC) and a selective catalytic reduction (SCR) catalyst. Typically the $NO_x$ adsorber catalyst (NAC) is followed by (e.g. is upstream of) the catalysed soot filter of the invention, and the catalysed soot filter of the invention is followed by (e.g. is upstream of) the selective catalytic reduction (SCR) catalyst. Such an arrangement may be termed a NAC/CSF/SCR. A nitrogenous reductant injector may be arranged between the catalysed soot filter and the selective catalytic reduction (SCR) catalyst. Thus, the catalysed soot filter may be followed by (e.g. is upstream of) a nitrogenous reductant injector, and the nitrogenous reductant injector may be followed by (e.g. is upstream of) the selective catalytic reduction (SCR) catalyst. Alternatively, or additionally to the nitrogenous reductant injector, ammonia can be generated in situ e.g. during rich regeneration of a NAC disposed upstream of the filter.

In the seventh exhaust system embodiment with an SCR catalyst, the $NO_x$ adsorber catalyst (NAC), the catalysed soot filter and the selective catalytic reduction (SCR) catalyst are generally connected in series with an optional nitrogenous reductant injector being connected between the oxidation catalyst and the selective catalytic reduction (SCR) catalyst. Thus, for example, an outlet of the $NO_x$ adsorber catalyst (NAC) is connected to an inlet of the catalysed soot filter, and outlet of the catalysed soot filter is connected to an inlet of the selective catalytic reduction (SCR) catalyst.

In any of the first through seventh inclusive exhaust system embodiments described hereinabove containing a SCR catalyst (including SCR catalysed filters), an ASC catalyst can be disposed downstream from the SCR catalyst or SCR catalysed filter (e.g. as a separate substrate monolith), or more preferably a zone on a downstream or trailing end of the substrate monolith comprising the SCR catalyst can be used as a support for the ASC.

A third aspect of the invention relates to a compression ignition engine comprising an exhaust system according to the second aspect of the invention. The compression ignition engine can be a homogenous charge compression ignition (HCCI) engine or a premixed charge compression ignition engine (PCCI) (see DieselNet Technology Guide "Engine Design for Low Emissions", Revision 2010.12a) or more conventional Port Fuel injected-type compression ignition engines.

A fourth aspect of the invention relates to a vehicle comprising a compression ignition engine and the exhaust system for the compression ignition engine. Generally, the compression ignition engine is a diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A fifth aspect relates to the use of catalysed soot filter according to the first aspect of the invention to oxidise carbon monoxide (CO) and hydrocarbons (HCs) and for reducing $NO_2$ emissions in an exhaust gas from a compression ignition engine; and the sixth aspect of the invention relates to a method of treating an exhaust gas from a compression ignition engine, which method comprises contacting the exhaust gas with the catalysed soot filter according to the first aspect of the invention.

Typically, the use and the corresponding method involve contacting the exhaust gas directly from the compression ignition engine with the catalysed soot filter. Thus, it is preferred that additional hydrocarbon (HC) is generally not injected into the exhaust gas prior to contacting the exhaust gas with the oxidation catalyst. The amount of hydrocarbon in the exhaust gas is preferably less than 1,000 ppm by volume, as converted to methane, more preferably less than 950 ppm by volume, still more preferably less than 750 ppm, typically before contacting the exhaust gas with the oxidation catalyst.

DEFINITIONS

For the avoidance of doubt, the term "modified alumina incorporating a heteroatom component" does not embrace "pure" alumina (i.e. alumina having a purity of ≥99.9%), a mixture of alumina and the heteroatom component, such as a mixture of silica and alumina, or a zeolite. In the context of the "modified alumina incorporating a heteroatom component", any amount in % by weight refers to the amount of heteroatom component, whether an element, ion or a compound, that is present in the host lattice of alumina with the remainder consisting essentially of alumina.

The term "alumina doped with a heteroatom component" generally refers to a material comprising a host lattice of alumina that is substitution doped or interstitially doped with a heteroatom component. In some instances, small amounts of the heteroatom component may be present (i.e. as a dopant) at a surface of the alumina. However, most of the dopant will generally be present in the body of the host lattice of the alumina. Alumina doped with a heteroatom component is generally commercially available, or can be prepared by conventional methods that are well known in the art or by using a method as described in U.S. Pat. No. 5,045,519.

The term "alkaline earth metal component" as used herein generally refers to an element or ion from Group 2 of the Periodic Table, a compound comprising an element or ion from Group 2 of the Periodic Table, or a metal alloy comprising an element from Group 2 of the Periodic Table, unless otherwise specified. The term "alkaline earth metal component" typically does not comprise or include the "modified alumina incorporating a heteroatom component". The "alkaline earth metal component" is not an "alumina doped with a heteroatom component" or an "alkaline earth metal aluminate" as described herein.

Generally, the "alkaline earth metal component" is (i) a compound comprising an alkaline earth metal, and/or (ii) a metal alloy comprising an alkaline earth metal. In the compound comprising an alkaline earth metal, the alkaline earth metal is typically present as a cation. The compound may, for example, be an alkaline earth metal oxide, an alkaline earth metal nitrate, an alkaline earth metal carbonate, or an alkaline earth metal hydroxide. In the metal alloy, the alkaline earth metal is typically present in elemental form (i.e. as a metal). The alkaline earth metal component is preferably a compound comprising an alkaline earth metal, more preferably a compound comprising a single alkaline earth metal.

The term "platinum group metal (PGM)" as used herein generally refers to platinum or palladium, unless otherwise specified. For the avoidance of doubt, this term does not, in general, include rhodium.

The term "platinum group metal (PGM) component" as used herein refers to any moiety that comprises a platinum group metal (PGM), such as elemental PGM (e.g. a PGM metal), a PGM ion (e.g. a cation, such as $Pt^{2+}$), a compound comprising a PGM (e.g. a PGM salt or an oxide of a PGM) or an alloy comprising a PGM (e.g. a platinum-palladium alloy). The term "platinum (Pt) component" as used herein refers to any moiety that comprises platinum, such as elemental platinum (e.g. platinum metal), a platinum ion (e.g. a cation, such as $Pt^{2+}$), a compound of platinum (e.g. a platinum salt or an oxide of platinum) or an alloy comprising platinum (e.g. a platinum-palladium alloy). The term "palladium (Pd) component" as used herein refers to any moiety that comprises palladium, such as elemental palladium (e.g. palladium metal), a palladium ion (e.g. a cation, such as $Pd^{2+}$), a compound of palladium (e.g. a palladium salt or an oxide of palladium) or an alloy comprising palladium (e.g. a platinum-palladium alloy).

The "platinum (Pt) component" is typically platinum metal or an alloy comprising platinum, particularly a platinum-palladium alloy. Preferably, the "platinum (Pt) component" is platinum metal.

The "palladium (Pd) component" is typically palladium metal, palladium oxide or an alloy comprising palladium, particularly a platinum-palladium alloy. Preferably, the "palladium (Pd) component" is palladium metal.

The term "noble metal component" as used herein refers to any moiety that comprises a noble metal, such as an elemental form of the noble metal, an ion of the noble metal, a compound of the noble metal or an alloy comprising the noble metal (e.g. a noble metal-platinum alloy or a noble metal-palladium alloy). It is preferred that the "noble metal component" is a noble metal itself (i.e. in elemental form) or an alloy comprising the noble metal. More preferably, the "noble metal component" is the noble metal itself (i.e. in elemental form).

Any reference to an amount of the "platinum group metal (PGM) component", "platinum (Pt) component", "palladium (Pd) component", "alkaline earth metal component" or the "noble metal component" as used herein generally refers to the amount of, respectively, PGM, platinum, palladium, alkaline earth metal or noble metal that is present. Thus, for example, if the "platinum group metal (PGM) component", "platinum (Pt) component", "palladium (Pd) component", "alkaline earth metal component" or the "noble metal component" is a compound comprising, respectively, a PGM, platinum, palladium, an alkaline earth metal or a noble metal, then the stated amount refers only to the total amount of the said metal that is present and does not include the other components of the compound.

Amounts given in units of g $ft^{-3}$ or g $in^{-3}$ generally relate to the volume of the substrate that is used.

Any reference to an amount of a material in terms of % by weight, such as for the amount of alkaline earth metal component, typically refers to a percentage of the overall weight of the layer/zone (e.g. washcoat coating) comprising that material.

The term "substantially cover" as used herein refers to at least 90% coverage, preferably at least 95% coverage, more preferably at least 99% coverage, of the surface area of the first layer by the second layer.

The term "substantially uniform length" as used herein refers to the length of layer that does not deviate by more than 10%, preferably does not deviate by more than 5%, more preferably does not deviate by more than 1%, from the mean value of the length of the layer.

The expression "consisting essentially" as used herein limits the scope of a feature to include the specified materials or steps, and any other materials or steps that do not materially affect the basic characteristics of that feature, such as for example minor impurities. The expression "consisting essentially of" embraces the expression "consisting of".

The term "zone" as used herein refers to a washcoat region or layer having a length that is less than the total length of the substrate. In general, the "zone" has a substantially uniform length. The term normally refers to the side-by-side arrangement of two or more washcoat regions or layers on the same substrate.

In order that the invention may be more fully understood, the following Examples are provided by way of illustration only and with reference to the accompanying drawings, in which:

EXAMPLES

Example 1

Preparative Methods

Samples containing an alkaline earth metal component and alumina doped with a heteroatom component as a support material were prepared as follows.

Silica doped alumina powder was slurried in water and milled to a $d_{90}$<20 micron. Barium acetate was added to the slurry followed by appropriate amounts of soluble platinum and palladium salts. The slurry was then stirred to homogenise. The resulting washcoat was applied to a cordierite flow through monolith having 400 cells per square inch using established coating techniques. The part was dried and calcined at 500° C.

For comparative purposes, samples containing alumina doped with a heteroatom component as a support material, but without the alkaline earth metal component were also prepared. The method above was used to prepare the samples except that the step of adding barium acetate was omitted.

As a further comparison, samples containing conventional alumina as a support material with and without the alkaline earth metal component were prepared as follows.

Alumina powder was slurried in water and milled to a $d_{90}$<20 micron. Barium acetate was added to the slurry followed by appropriate amounts of soluble platinum and palladium salts. The slurry was then stirred to homogenise. The resulting washcoat was applied to a cordierite flow through monolith having 400 cells per square inch using established coating techniques. The part was dried and calcined at 500° C.

Analogous alumina samples without the alkali earth metal component were prepared by omitting the barium acetate addition step.

The formulations contained a total loading of 50 gft$^{-3}$ of platinum group metal. The samples containing barium were prepared using a loading of 150 gft$^{-3}$. Alumina doped with 5% silica was used as the modified alumina.

Measurement of CO $T_{50}$

The catalytic activity was determined using a synthetic gas bench activity test (SCAT). Parts to be tested were first cored using a core drill and aged in an oven at 750° C. for 5 hours using hydrothermal conditions (10% water). The aged cores were tested in a simulated catalyst activity testing (SCAT) gas apparatus using the inlet gas mixtures in Table 1. In each case the balance is nitrogen.

TABLE 1

| Gas component | Composition |
| --- | --- |
| CO | 1500 ppm |
| HC (as $C_1$) | 430 ppm |
| NO | 100 ppm |
| $CO_2$ | 4% |
| $H_2O$ | 4% |
| $O_2$ | 14% |
| Space velocity | 55000/hour |

Results

Figure 1:
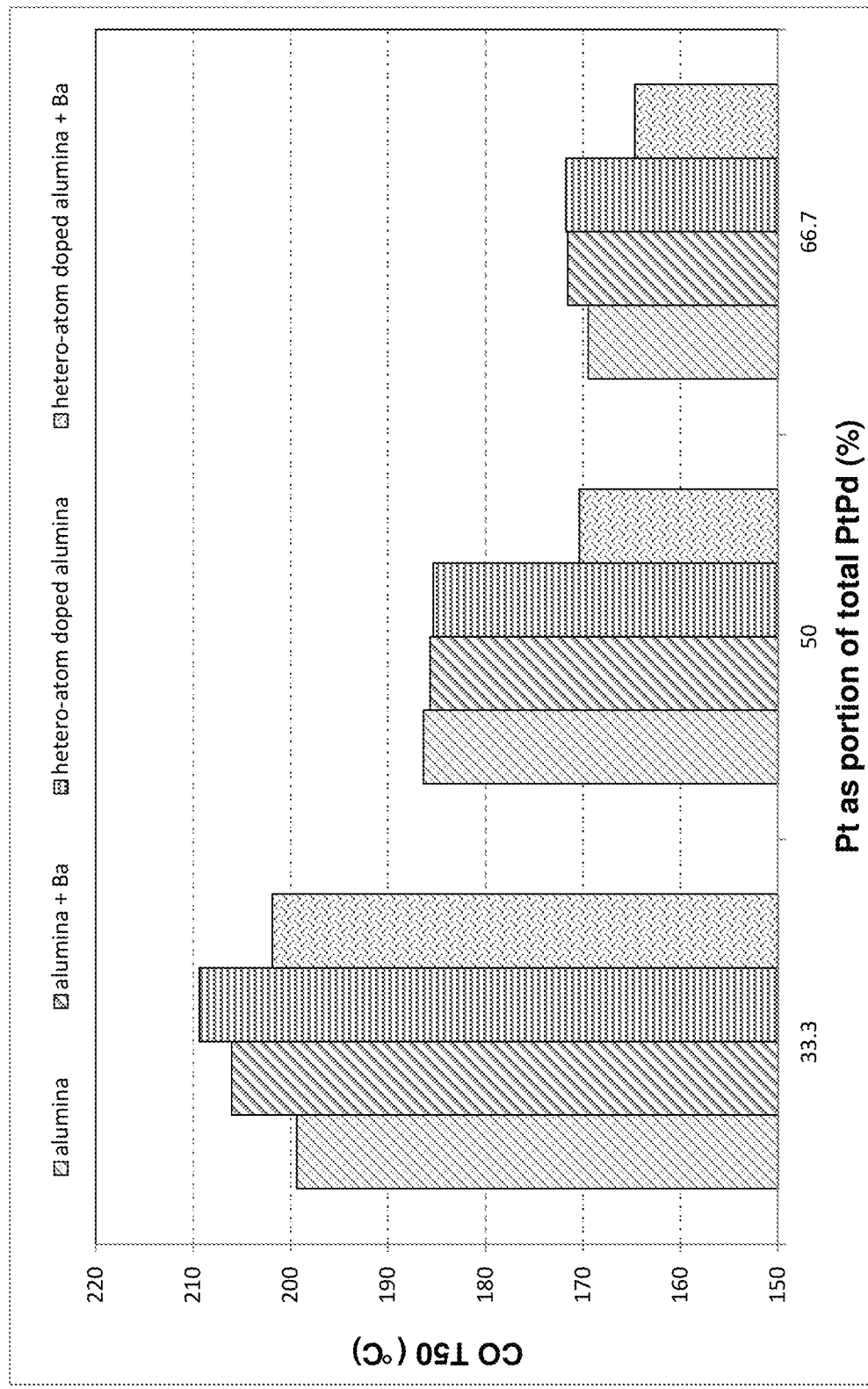
FIG. 1 is a histogram showing measurements of carbon monoxide "light-off" temperatures (° C.) at 50% conversion (CO $T_{50}$) for catalyst formulations comprising varying amounts of platinum and palladium. The x-axis shows the % by weight of platinum in relation to the total content of platinum group metal in the formulation. At each point on the x-axis, the first bar (from the left) represents a sample containing standard alumina and no barium, the second bar represents a sample containing alumina and barium, the third bar represents a sample containing a modified alumina and no barium, and the fourth bar represents a sample containing a modified alumina and barium.

The results of the measurements are shown in FIG. 1. FIG. 1 shows the improved activity of catalysts of the invention, which comprise both a modified alumina and barium at a loading of 150 gft$^{-3}$. The catalysts of the invention have a lower CO $T_{50}$ light off temperature than the comparative catalysts that do not contain barium. This is particularly apparent when the ratio by mass of Pt:Pd is in the range of 1:2 to 2:1. The catalysts containing conventional alumina as a support material and barium do not show an improved CO $T_{50}$ light off temperature compared to catalysts containing conventional alumina and no barium.

Example 2

Samples containing alumina doped with 5% silica, Pt:Pd in a mass ratio of 1:1 at a total PGM loading of 50 gft$^{-3}$ and varying amounts of barium were prepared using the method described above. The CO $T_{50}$ light off temperatures were also measured using the same procedure as set out above.

Results

The results of the CO "light-off" measurements are shown in Table 2 below.

TABLE 2

| Sample No. | Amount of Ba (gft$^{-3}$) | CO T$_{50}$ (° C.) |
|---|---|---|
| 2-1 | 0 | 186 |
| 2-2 | 150 | 170 |
| 2-3 | 300 | 166 |

Example 3

Preparative Method

Silica doped alumina powder was slurried in water and milled to a d$_{90}$<20 micron. Strontium acetate was added to the slurry followed by appropriate amounts of soluble platinum and palladium salts. The mass ratio of Pt:Pd was 1:1 at a total PGM loading of 50 gft$^{-3}$. The slurry was then stirred to homogenise. The resulting washcoat was applied to a cordierite flow through monolith having 400 cells per square inch using established coating techniques. The part was dried and calcined at 500° C. The CO T$_{50}$ light off temperatures were also measured using the same procedure as set out above.

Results

The results of the CO "light-off" measurements are shown in Table 3 below.

TABLE 3

| Sample No. | Alkaline Earth Metal (AEM) | Amount of AEM (gft$^{-3}$) | Support | CO T$_{50}$ (° C.) |
|---|---|---|---|---|
| 3-1 | Ba | 100 | A1 | 164 |
| 3-2 | Ba | 150 | A2 | 166 |
| 3-3 | Sr | 150 | A1 | 178 |
| 3-4 | Sr | 300 | A1 | 176 |

Catalysts containing strontium show a lower CO T$_{50}$ light off than a comparative catalyst without strontium (see Sample 2-1 in Table 2). Samples 3-1 and 3-2 show that a reduction in CO T$_{50}$ light off is achieved using two different hetero-atom doped aluminas. Support A1 is a 5% silica doped alumina and support A2 is a 10% silica doped alumina.

Example 4

Preparative Method

Magnesium doped alumina powder was slurried in water and milled to a d$_{90}$<20 micron. Barium acetate was added to the slurry followed by appropriate amounts of soluble platinum and palladium salts. The mass ratio of Pt:Pd was 2:1 at a total PGM loading of 50 gft$^{-3}$. The slurry was then stirred to homogenise. The resulting washcoat was applied to a cordierite flow through monolith having 400 cells per square inch using established coating techniques. The part was dried and calcined at 500° C.

For comparative purposes, catalysts containing magnesium doped alumina as a support material without an alkali earth metal were prepared in the same way, except that the barium acetate addition step was omitted.

The CO T$_{50}$ light off temperatures were also measured using the procedure set out above.

Results

The results of the CO "light-off" measurements are shown in Table 4 below.

TABLE 4

| Sample No. | Amount of Ba (gft$^{-3}$) | Support | CO T$_{50}$ (° C.) |
|---|---|---|---|
| 4-1 | 0 | A1 | 177 |
| 4-2 | 130 | A1 | 170 |
| 4-3 | 0 | A3 | 193 |
| 4-4 | 130 | A3 | 174 |

A3 = Magnesium aluminate having 20% by weight magnesium.

The samples containing a support material comprising magnesium aluminate show a lower CO T$_{50}$ light off when barium is included in the formulation than those sample prepared without barium. The light off temperature is reduced by 19° C.

Example 5

Preparative Method

A catalyst (5-1) was prepared via incipient wetness impregnation of barium acetate solution on to a silica doped alumina support. The material was dried at 105° C. A second solution of platinum and palladium salts was then added by incipient wetness impregnation. The resulting material was dried at 105° C. then calcined at 500° C. The final composition was 0.65 wt % Pt, 0.35 wt % Pd and 10 wt % Ba.

A comparative catalyst (5-2) was prepared using the same method but without the barium acetate impregnation on to the silica doped alumina support. The final composition was 0.65 wt % Pt and 0.35 wt % Pd.

The % NO oxidation activity against temperature of each catalyst was tested when the catalyst was freshly prepared (e.g. "fresh" catalyst) and after hydrothermal ageing each catalyst at 750° C. for 48 hours (e.g. "aged" catalyst). The test gas mix is given in Table 5. In each case the balance is nitrogen.

TABLE 5

| Gas component | Composition |
|---|---|
| CO | 1500 ppm |
| HC (as C$_1$) | 783 ppm |
| NO | 100 ppm |
| CO$_2$ | 5% |
| H$_2$O | 5% |
| O$_2$ | 14% |

Results

The difference between the activity of the "fresh" and the "aged" versions of each catalyst is shown in Table 6 below.

TABLE 6

| | Difference in % NO oxidation between "fresh" and "aged" | |
|---|---|---|
| Sample No. | 210° C. | 270° C. |
| 5-1 | 3% | 4% |
| 5-2 | 21% | 23% |

The results in Table 6 show that catalyst 5-1 has a smaller difference in % NO oxidation performance between "fresh" and "aged" than catalyst 5-2. This difference is important for exhaust system where there is a downstream emissions control device, particularly a SCR or SCRF catalyst, because the activity of such downstream emissions control devices may be affected by the NO$_x$ content of the exhaust gas, especially the NO:NO$_2$ ratio.

Example 6

Alumina powder was slurried in water and milled to a particle size d90<6 µm. Appropriate amounts of soluble platinum and palladium salts were added to the slurry, followed by beta zeolite such that the slurry comprised 80% alumina and 20% zeolite by mass. The slurry was stirred to homogenise. The resulting washcoat was applied to a 3.0 litre volume silicon carbide substrate having 300 cells per square inch (cpsi), 12 thousandths of an inch wall thickness and 42% porosity using established coating techniques. The part was dried and calcined at 500° C.

The finished catalysed soot filter had a total PGM loading of 20 g ft$^{-3}$.

Example 7

Alumina powder was slurried in water and milled to a particle size d90<6 µm. Barium acetate was added to the slurry followed by appropriate amounts of soluble platinum and palladium salts and beta zeolite such that the slurry comprised 80% alumina and 20% zeolite by mass. The slurry was stirred to homogenise. The resulting washcoat was applied to a 3.0 litre volume silicon carbide substrate having 300 cpsi, 12 thousandths of an inch wall thickness and 42% porosity using established coating techniques. The part was dried and calcined at 500° C.

The finished catalysed soot filter had a total PGM loading of 20 g ft$^{-3}$.

Example 8

Silica doped alumina powder was slurried in water and milled to a particle size d90<6 µm. Barium acetate was added to the slurry followed by appropriate amounts of soluble platinum and palladium salts and beta zeolite such that the slurry comprised 80% silica doped alumina and 20% zeolite by mass. The slurry was stirred to homogenise. The resulting washcoat was applied to a 3.0 litre volume silicon carbide substrate having 300 cpsi, 12 thousandths of an inch wall thickness and 42% porosity using established coating techniques. The part was dried and calcined at 500° C.

The finished catalysed soot filter had a total PGM loading of 20 g ft$^{-3}$.

Example 9

Testing

The samples prepared according to Examples 6, 7 and 8 were each hydrothermally aged in an oven at 800° C. for 16 hours. They were then exposed to exhaust gas emissions from a Euro 5 turbo charged diesel bench mounted engine running <10 ppm sulphur fuel. Pollutant emissions were measured both before and after the catalysed soot filters. The light-off activity of the catalysts was determined by increasing the exhaust gas temperature by applying load to the engine via a dynamometer.

Figure 2:
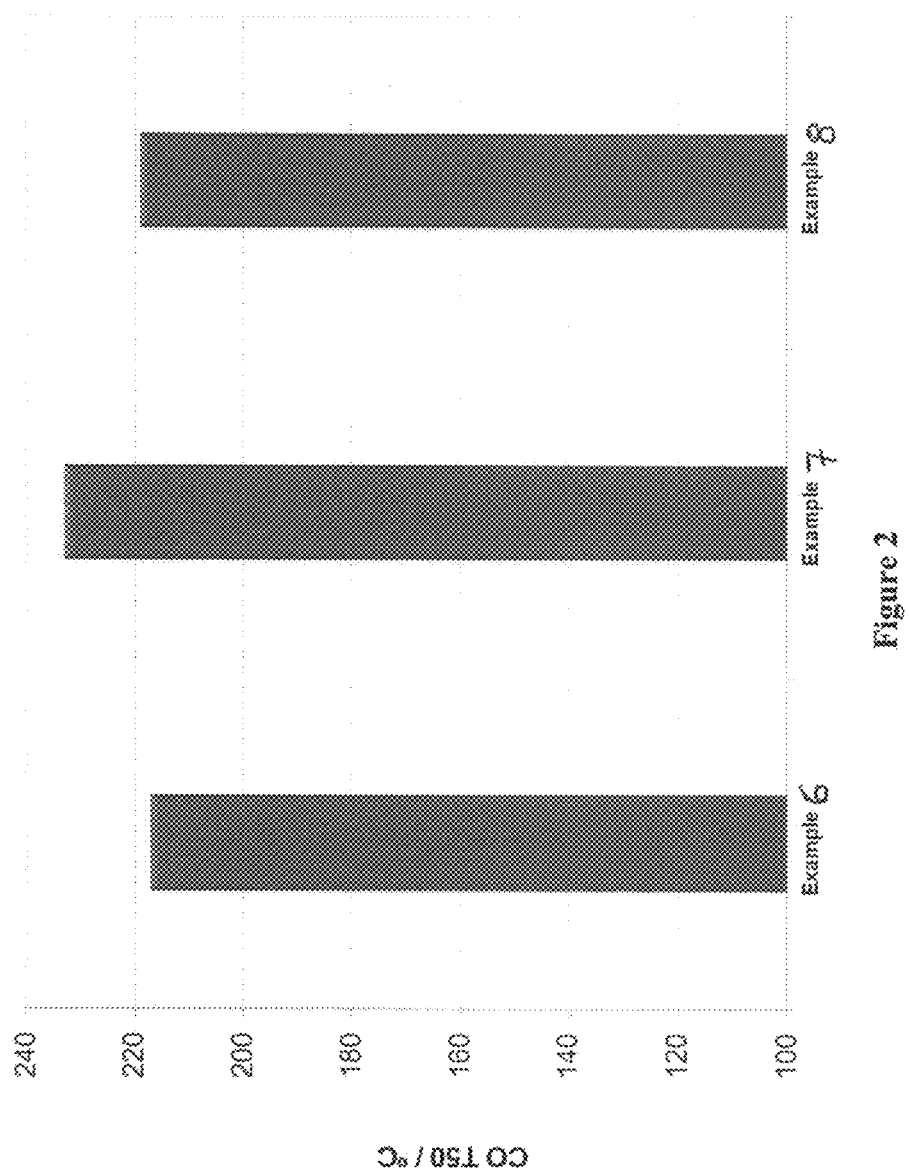
FIG. 2 is a histogram showing measurements of carbon monoxide "light-off" temperatures (° C.) at 50% conversion (CO $T_{50}$) for catalyst formulations according to Examples 6, 7 and 8 when tested on a bench-mounted Euro 5 turbocharged diesel engine running on <10 ppm sulphur fuel.

FIG. 2 shows the $T_{50}$ CO light off activity of Example 6, Example 7 and Example 8. In FIG. 2 we see that the sample of Example 6 and Example 8 have very similar light-off temperatures. However, the sample of Example 7 has a much higher CO light off.

Table 7 shows the percentage of $NO_2$ in $NO_x$ emitted from the catalysed soot filter at 300° C. during the light-off test. Example 6 has a relatively high percentage of $NO_2$ in $NO_x$ at 15%. Example 7 and Example 8 both show just 1% $NO_2$ in $NO_x$.

TABLE 7

| $NO_2$ in $NO_x$ at 300° C. (Emissions from bench-mounted Euro 5 turbo-charged diesel engine running on <10 ppm sulphur fuel) | |
|---|---|
| | $NO_2$ in $NO_x$ |
| Example 6 | 15% |
| Example 7 | 1% |
| Example 8 | 1% |

Example 8 according to the invention shows low $NO_2$ in $NO_x$ whilst maintaining good CO oxidation activity.

For the avoidance of any doubt, the entire content of any and all documents cited herein is incorporated by reference into the present application.

The invention claimed is:

1. A catalysed soot filter comprising an oxidation catalyst for treating carbon monoxide (CO) and hydrocarbons (HCs) in exhaust gas from a compression ignition engine disposed on a filtering substrate, wherein the oxidation catalyst comprises:
   a platinum group metal (PGM) component selected from the group consisting of a platinum (Pt) component, a palladium (Pd) component and a combination thereof;
   an alkaline earth metal component; and
   a support material comprising a modified alumina incorporating a heteroatom component; wherein the total amount of the alkaline earth metal component is 10 to 500 gft$^{-3}$.

2. A catalysed soot filter according to claim 1, wherein the modified alumina incorporating a heteroatom component is an alumina doped with a heteroatom component, an alkaline earth metal aluminate or a mixture thereof.

3. A catalysed soot filter according to claim 1, wherein the heteroatom component comprises silicon, magnesium, barium, lanthanum, cerium, titanium, zirconium or a combination of two or more thereof.

4. A catalysed soot filter according to claim 1, wherein the modified alumina incorporating a heteroatom component is alumina doped with silica.

5. A catalysed soot filter according to claim 4, wherein the alumina is doped with silica in an amount of 0.5 to 45% by weight.

6. A catalysed soot filter according to claim 1, wherein the modified alumina incorporating a heteroatom component is an alkaline earth metal aluminate.

7. A catalysed soot filter according to claim 6, wherein the alkaline earth metal aluminate is magnesium aluminate.

8. A catalysed soot filter according to claim 1, wherein the alkaline earth metal component comprises magnesium (Mg), calcium (Ca), strontium (Sr), barium (Ba) or a combination of two or more thereof.

9. A catalysed soot filter according to claim 8, wherein the alkaline earth metal component comprises strontium (Sr) or barium (Ba).

10. A catalysed soot filter according to claim 1, wherein the oxidation catalyst comprises a single layer disposed on the filtering substrate, wherein the single layer comprises the platinum group metal (PGM) component selected from the group consisting of a platinum (Pt) component, a palladium (Pd) component and a combination thereof; the alkaline earth metal component; and the support material.

11. A catalysed soot filter according to claim 1, wherein the oxidation catalyst comprises two layers, wherein a first layer is disposed on the filtering substrate and a second layer is disposed on the first layer.

12. A catalysed soot filter according to claim 1, wherein the oxidation catalyst comprises a first zone and a second zone in a side-by-side arrangement on the substrate.

13. A catalysed soot filter according to claim 1, wherein the filtering substrate is a ceramic wallflow filter.

14. An exhaust system for a compression ignition engine comprising a catalysed soot filter according to claim 1.

15. An exhaust system according to claim 14, wherein the oxidation catalyst comprises a first zone and a second zone in a side-by-side arrangement on the substrate and wherein the second zone is upstream of the first zone.

16. An exhaust system according to claim 14, comprising a diesel oxidation catalyst disposed on a separate flow-through substrate monolith, which is disposed upstream of the catalysed soot filter.

17. A compression ignition engine comprising an exhaust system according to claim 14.

18. A method of treating carbon monoxide (CO) and hydrocarbons (HCs) and $NO_2$ in an exhaust gas from a compression ignition engine, which method comprises contacting the exhaust gas with a catalysed soot filter according to claim 1.

19. A method according to claim 9, wherein the oxidation catalyst comprises a first zone and a second zone in a side-by-side arrangement on the substrate and wherein the exhaust gas contacts the second zone before the first zone.

* * * * *